United States Patent
Tsubouchi et al.

(10) Patent No.: US 10,693,159 B2
(45) Date of Patent: Jun. 23, 2020

(54) FUEL CELL SYSTEM AND CONTROL DEVICE

(71) Applicant: TOYOTA JIDOSHA KABUSHIKI KAISHA, Toyota-shi (JP)

(72) Inventors: Masakatsu Tsubouchi, Toyota (JP); Ryosuke Fukaya, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 202 days.

(21) Appl. No.: 16/033,611

(22) Filed: Jul. 12, 2018

(65) Prior Publication Data
US 2019/0036139 A1 Jan. 31, 2019

(30) Foreign Application Priority Data
Jul. 26, 2017 (JP) .................................. 2017-144698

(51) Int. Cl.
*H01M 8/04007* (2016.01)
*H01M 8/04082* (2016.01)
*H01M 8/04089* (2016.01)
*H01M 8/0432* (2016.01)
*H01M 8/0438* (2016.01)
*H01M 8/04746* (2016.01)

(52) U.S. Cl.
CPC ... *H01M 8/04753* (2013.01); *H01M 8/04074* (2013.01); *H01M 8/04089* (2013.01); *H01M 8/04104* (2013.01); *H01M 8/04201* (2013.01); *H01M 8/04328* (2013.01); *H01M 8/04388* (2013.01); *H01M 8/04425* (2013.01); *H01M 8/04432* (2013.01)

(58) Field of Classification Search
CPC ......... H01M 8/04074; H01M 8/04089; H01M 8/04104; H01M 8/04201; H01M 8/04328; H01M 8/04388; H01M 8/04425; H01M 8/04432; H01M 8/04753
See application file for complete search history.

(56) References Cited

U.S. PATENT DOCUMENTS

2010/0316926 A1 12/2010 Ishikawa et al.
2016/0181635 A1 6/2016 Nagata

FOREIGN PATENT DOCUMENTS

| JP | 2003-217641 | | 7/2003 |
| JP | 2006-073404 | | 3/2006 |
| JP | 2008-74291 | A | 4/2008 |
| JP | 2009-27889 | A | 2/2009 |
| JP | 2011-12773 | A | 1/2011 |
| JP | 2016-114012 | A | 6/2016 |

*Primary Examiner* — Brittany L Raymond
(74) *Attorney, Agent, or Firm* — Oblon, McClelland, Maier & Neustadt, L.L.P.

(57) ABSTRACT

A fuel cell system includes: a pressure control valve that is disposed in a supply path for supplying hydrogen and decompresses hydrogen to be supplied to a fuel cell stack; an expander that is disposed upstream from the pressure control valve in the supply path and decompresses and expands hydrogen supplied from a hydrogen tank; a second control valve that is disposed upstream from the expander in the supply path and is able to be switched to one of an open state in which hydrogen is supplied to the expander and a closed state in which a supply of hydrogen to the expander is intercepted or an amount of hydrogen supplied to the expander is less than that in the open state; and a control device including a control unit that controls the second control valve.

11 Claims, 17 Drawing Sheets

FUEL CELL SYSTEM AND CONTROL DEVICE

INCORPORATION BY REFERENCE

The disclosure of Japanese Patent Application No. 2017-144698 filed on Jul. 26, 2017 including the specification, drawings and abstract is incorporated herein by reference in its entirety.

BACKGROUND

1. Technical Field

The disclosure relates to a fuel cell system and a control device.

2. Description of Related Art

Japanese Unexamined Patent Application Publication No. 2003-217641 (JP 2003-217641 A) discloses a fuel cell system that has an expander, which decompresses hydrogen, disposed between a high-pressure hydrogen tank and a fuel cell stack and converts expansion energy when hydrogen is expanded in the expander into mechanical energy.

SUMMARY

However, expansion energy in the expander depends on a flow rate of hydrogen and a difference in pressure upstream and downstream from the expander. That is, when hydrogen flows into the expander in a state in which the difference is relatively small, an amount of energy which can be output from the expander decreases even in a state in which the flow rate of hydrogen is relatively high.

The disclosure enables efficient recovering of expansion energy of hydrogen in an expander.

According to a first aspect of the disclosure, there is provided a fuel cell system including: a first decompression unit that is disposed in a supply path for supplying hydrogen from a hydrogen tank to a fuel cell stack and decompresses hydrogen to be supplied to the fuel cell stack; an expander that is disposed upstream from the first decompression unit in the supply path and decompresses and expands hydrogen supplied from the hydrogen tank; a flow rate adjusting unit that is disposed upstream from the expander in the supply path and is able to be switched to one of an open state in which hydrogen is supplied to the expander and a closed state in which a supply of hydrogen to the expander is intercepted or an amount of hydrogen supplied to the expander is less than that in the open state; and a control unit that performs control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value.

When the pressure difference between the first pressure upstream from the expander and the second pressure downstream from the expander in the supply path is less than the first threshold value or when the pressure ratio of the second pressure to the first pressure is equal to or greater than the second threshold value, the flow rate adjusting unit is switched to the closed state. Accordingly, since hydrogen is not supplied to the expander in a state in which the pressure difference is less than the first threshold value or the pressure ratio is equal to or greater than the second threshold value, it is possible to efficiently recover expansion energy of hydrogen in the expander.

The fuel cell system may further include: a first pressure sensor that measures an internal pressure of the hydrogen tank as the first pressure; and a second pressure sensor that measures a pressure between the expander and the first decompression unit as the second pressure. Accordingly, it is possible to accurately obtain the pressure difference between the pressure upstream from the expander and the pressure downstream from the expander or the pressure ratio.

The control unit may perform control of switching the flow rate adjusting unit to the open state when the pressure difference is equal to or greater than a third threshold value which is greater than the first threshold value or when the pressure ratio is less than a fourth threshold value which is less than the second threshold value. Accordingly, it is possible to efficiently recover expansion energy of hydrogen in the expander.

A bypass path that bypasses the expander from upstream to downstream may be provided in the supply path. The flow rate adjusting unit may be a three-way valve that is provided in an upstream portion in the supply path connected to a first end of the bypass path, the three-way valve supplying hydrogen to the expander and intercepting supply of hydrogen to the bypass path in the open state and having a first closed state in which the supply of hydrogen to the expander is intercepted and hydrogen is supplied to the bypass path and a second closed state in which supply of hydrogen to both the expander and the bypass path is intercepted as the closed state. Accordingly, it is possible to provide a supply path of hydrogen not including an expander.

The fuel cell system may further include a heat exchanger that is provided between a downstream portion in the supply path connected to a second end of the bypass path and the expander and performs heat exchange between hydrogen decompressed and expanded by the expander and a coolant for cooling the fuel cell stack. Accordingly, it is possible to efficiently cool the fuel cell stack.

The fuel cell system may further include a temperature sensor that measures a temperature of the coolant. The control unit may perform control of switching the flow rate adjusting unit to the first closed state when the temperature measured by the temperature sensor is equal to or lower than a predetermined temperature threshold value. Accordingly, it is possible to curb supercooling of the fuel cell stack.

The first decompression unit may be provided between a downstream portion in the supply path connected to a second end of the bypass path and the expander. The fuel cell system may further include: a second decompression unit that is provided between the expander and the flow rate adjusting unit and decompresses hydrogen which is supplied from the hydrogen tank; a third decompression unit that is provided in the bypass path and decompresses hydrogen which is supplied to the fuel cell stack; and an injector that is provided between the downstream portion and the fuel cell stack. Accordingly, it is possible to stabilize an output.

The first decompression unit may be provided between a downstream portion in the supply path connected to a second end of the bypass path and the expander. The fuel cell system may further include: a second decompression unit that is provided between the flow rate adjusting unit and the hydrogen tank and decompresses hydrogen which is supplied from the hydrogen tank; and an injector that is provided in the bypass path. Accordingly, it is possible to decrease the size of the system.

According to a second aspect of the disclosure, there is provided a control device that controls a decompression unit that is disposed in a supply path for supplying hydrogen from a hydrogen tank to a fuel cell stack and decompresses hydrogen to be supplied to the fuel cell stack, an expander that is disposed upstream from the decompression unit in the supply path and decompresses and expands hydrogen supplied from the hydrogen tank, and a flow rate adjusting unit that is disposed upstream from the expander in the supply path and is able to be switched to one of an open state in which hydrogen is supplied to the expander and a closed state in which a supply of hydrogen to the expander is intercepted or an amount of hydrogen supplied to the expander is less than that in the open state. The control device includes: a control unit that performs control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value. Accordingly, it is possible to efficiently recover expansion energy of hydrogen in the expander.

According to a third aspect of the disclosure, there is provided a fuel cell system comprising: a first decompression unit that is disposed in a supply path for supplying hydrogen from a hydrogen tank to a fuel cell stack and is configured to decompress hydrogen to be supplied to the fuel cell stack; an expander that is disposed upstream from the first decompression unit in the supply path and is configured to decompress and expand hydrogen supplied from the hydrogen tank; a flow rate adjusting unit that is disposed upstream from the expander in the supply path and is configured to be able to be switched to one of an open state in which hydrogen is supplied to the expander and a closed state in which a supply of hydrogen to the expander is intercepted or an amount of hydrogen supplied to the expander is less than that in the open state; and a control unit that is programmed to perform control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value.

According to a fourth aspect of the disclosure, there is provided a control device that controls a decompression unit that is disposed in a supply path for supplying hydrogen from a hydrogen tank to a fuel cell stack and is configured to decompress hydrogen to be supplied to the fuel cell stack, an expander that is disposed upstream from the decompression unit in the supply path and is configured to decompress and expand hydrogen supplied from the hydrogen tank, and a flow rate adjusting unit that is disposed upstream from the expander in the supply path and is configured to be able to be switched to one of an open state in which hydrogen is supplied to the expander and a closed state in which a supply of hydrogen to the expander is intercepted or an amount of hydrogen supplied to the expander is less than that in the open state. The control device includes: a control unit that is programmed to perform control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value.

As described above, according to the disclosure, it is possible to efficiently recover expansion energy of hydrogen in the expander.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the accompanying drawings. In the following embodiments, it is assumed that a fuel cell system is mounted in a vehicle.

First Embodiment

Figure 1:
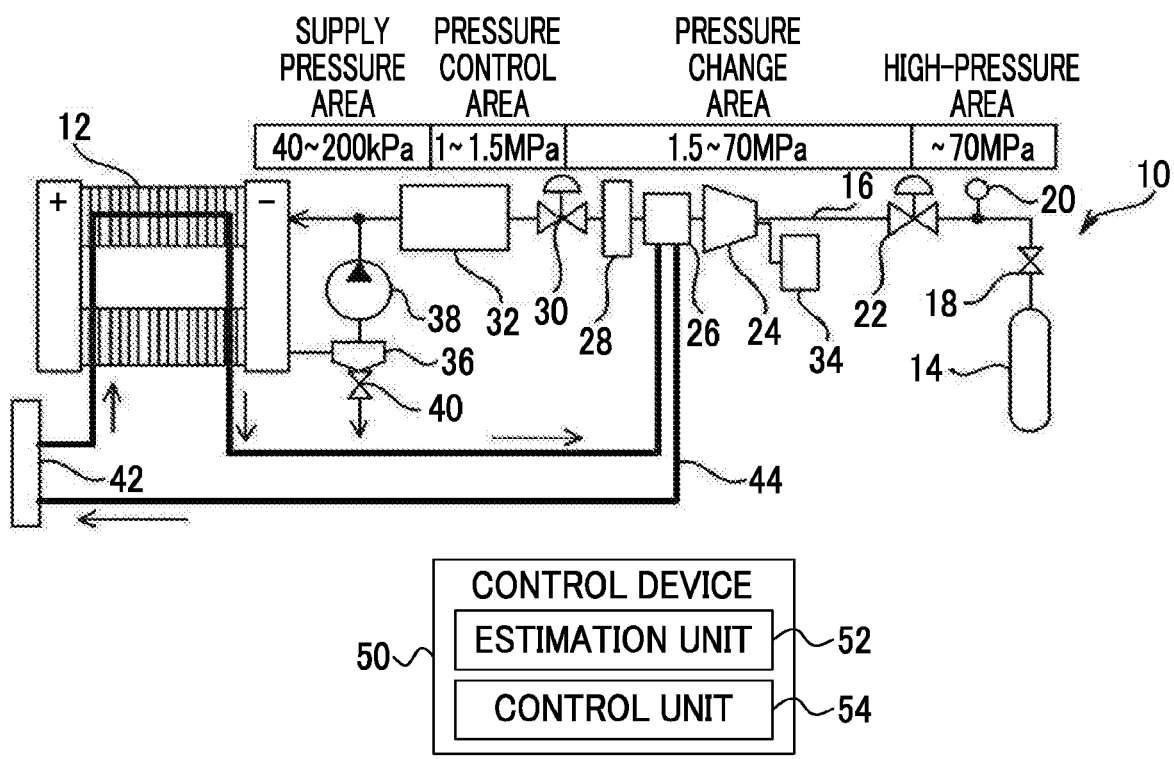
FIG. 1 is a diagram schematically illustrating an example of a configuration of a fuel cell system according to a first embodiment.

First, a configuration of a fuel cell system 10 according to a first embodiment of the disclosure will be described below with reference to FIG. 1. As illustrated in FIG. 1, the fuel cell system 10 includes a fuel cell stack 12, a hydrogen tank 14, a first control valve 18, a first pressure sensor 20, a second control valve 22, an expander 24, a heat exchanger 26, a sub tank 28, a pressure control valve 30, and an injector 32. The fuel cell system 10 additionally includes an energy recovery device 34, a gas-liquid separation unit 36, a hydrogen pump 38, a drain valve 40, a radiator 42, and a control device 50.

The fuel cell stack 12 is a unit that generates electric power by an electrochemical reaction between hydrogen and oxygen and has a configuration in which a plurality of unit cells are stacked. The hydrogen tank 14 is filled with hydrogen of a high pressure (for example, 70 MPa or higher) that is supplied to the fuel cell stack 12. In the following description, the hydrogen tank 14 side is defined as upstream in a flow passage of hydrogen and the fuel cell stack 12 side is defined as downstream in the flow passage of hydrogen.

In a supply path 16 of hydrogen from the hydrogen tank 14 to the fuel cell stack 12, the first control valve 18, the first pressure sensor 20, the second control valve 22, the expander 24, the heat exchanger 26, the sub tank 28, the pressure control valve 30, and the injector 32 are provided in this order from upstream to downstream.

The first control valve 18 is a valve that is switched to one of an open state and a closed state under the control of the control device 50. The first pressure sensor 20 measures a pressure between the first control valve 18 and the second control valve 22 as an internal pressure of the hydrogen tank 14. The internal pressure of the hydrogen tank 14 may be measured by a pressure sensor that is provided in the hydrogen tank 14. The second control valve 22 is an example of a flow rate adjusting unit in the disclosed technique and is a valve that is switched to one of a closed state in which supply of hydrogen from the hydrogen tank 14 to the expander 24 is intercepted and an open state in which hydrogen is supplied from the hydrogen tank 14 to the expander 24 under the control of the control device 50.

The expander 24 decompresses and expands hydrogen which is supplied from the hydrogen tank 14. The energy recovery device 34 is connected to the expander 24, and the energy recovery device 34 converts expansion energy when the expander 24 decompresses and expands hydrogen into mechanical energy and recovers the expansion energy. Examples of the energy recovery device 34 include a reduction gear, a power generator, an intake air compressor, and a blower.

The heat exchanger 26 performs heat exchange between hydrogen cooled by decompression and expansion in the expander 24 and a coolant circulating in a coolant circulation passage 44 which will be described later. Hydrogen is stored in the sub tank 28. The pressure control valve 30 is an example of a decompression unit in the disclosed technique and decompresses hydrogen which flows from the sub tank 28. The injector 32 includes, for example, an electromagnetic on-off valve and adjusts an amount of hydrogen supplied to the fuel cell stack 12.

In this embodiment, a pressure area between the fuel cell stack 12 and the injector 32 is defined as a supply pressure area, and the pressure of the supply pressure area is, for example, equal to or greater than 40 [kPa] and less than 200 [kPa]. In this embodiment, a pressure area between the injector 32 and the pressure control valve 30 is defined as a pressure control area, and the pressure of the pressure control area is, for example, equal to or greater than 1 [MPa] and less than 1.5 [MPa]. In this embodiment, a pressure area between the pressure control valve 30 and the second control valve 22 is defined as a pressure change area, and the pressure of the pressure change area is, for example, equal to or greater than 1.5 [MPa] and less than 70 [MPa]. In this embodiment, a pressure area upstream from the second control valve 22 is defined as a high-pressure area, and the pressure of the high-pressure area is, for example, equal to or less than 70 [MPa].

The gas-liquid separation unit 36 separates hydrogen gas and reaction gas discharged from the fuel cell stack 12 into a gas component and a liquid component. The hydrogen pump 38 serves as a circulation pump that sends hydrogen included in the gas component separated by the gas-liquid separation unit 36 to downstream from the injector 32 in the supply path 16. The liquid component separated by the gas-liquid separation unit 36 is discharged to the outside via the drain valve 40. The radiator 42 includes, for example, a fan that takes in outside air, and cools a coolant flowing in the coolant circulation passage 44 by rotating the fan. The fuel cell stack 12 is cooled by the coolant flowing in the coolant circulation passage 44.

The control device 50 functionally includes an estimation unit 52 and a control unit 54 as illustrated in FIG. 1. The estimation unit 52 estimates a pressure difference PD (=P1−P2) between a pressure P1 upstream from the expander 24 and a pressure P2 downstream therefrom. In this embodiment, the estimation unit 52 uses a pressure measured by the first pressure sensor 20 as the pressure P1. The estimation unit 52 estimates a pressure between the pressure control valve 30 and the expander 24 based on a cumulative amount of hydrogen injected from the injector 32 after the second control valve 22 has been closed and an amount of hydrogen remaining in the hydrogen tank 14, and uses the estimated pressure as the pressure P2. The estimation unit 52 estimates a value obtained by subtracting the pressure P2 from the pressure P1 as the pressure difference PD.

The control unit 54 intercepts supply of hydrogen to the expander 24 by performing control of switching the second control valve 22 to the closed state when the pressure difference PD estimated by the estimation unit 52 is less than a predetermined threshold value TH1. In this case, the threshold value TH1 can be appropriately determined depending on a design specification of the expander 24. The control unit 54 starts supply of hydrogen to the expander 24 by performing control of switching the second control valve 22 to the open state when the pressure P2 estimated by the estimation unit 52 is less than a predetermined lower limit value LV1 (for example, 2 MPa).

Figure 2:
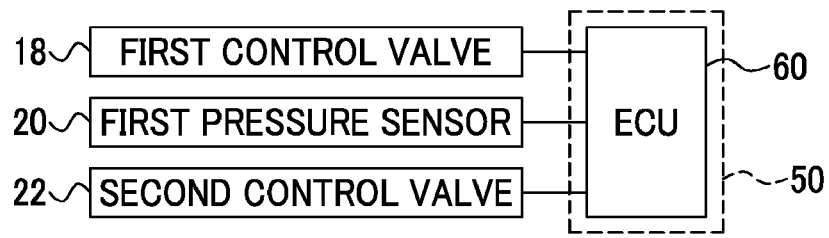
FIG. 2 is a block diagram illustrating an example of a hardware configuration of a control device according to the first embodiment.

A hardware configuration of the control device 50 will be described below with reference to FIG. 2. As illustrated in FIG. 2, the control device 50 includes an electronic control unit (ECU) 60. The ECU 60 is configured as a microcomputer including a central processing unit (CPU), a read only memory (ROM), and a random access memory (RAM). The first control valve 18, the first pressure sensor 20, the second control valve 22, and the like are connected to the ECU 60. With this configuration, the ECU 60 performs control of the first control valve 18 and the second control valve 22 and acquisition of the pressure measured by the first pressure sensor 20.

Figure 3:
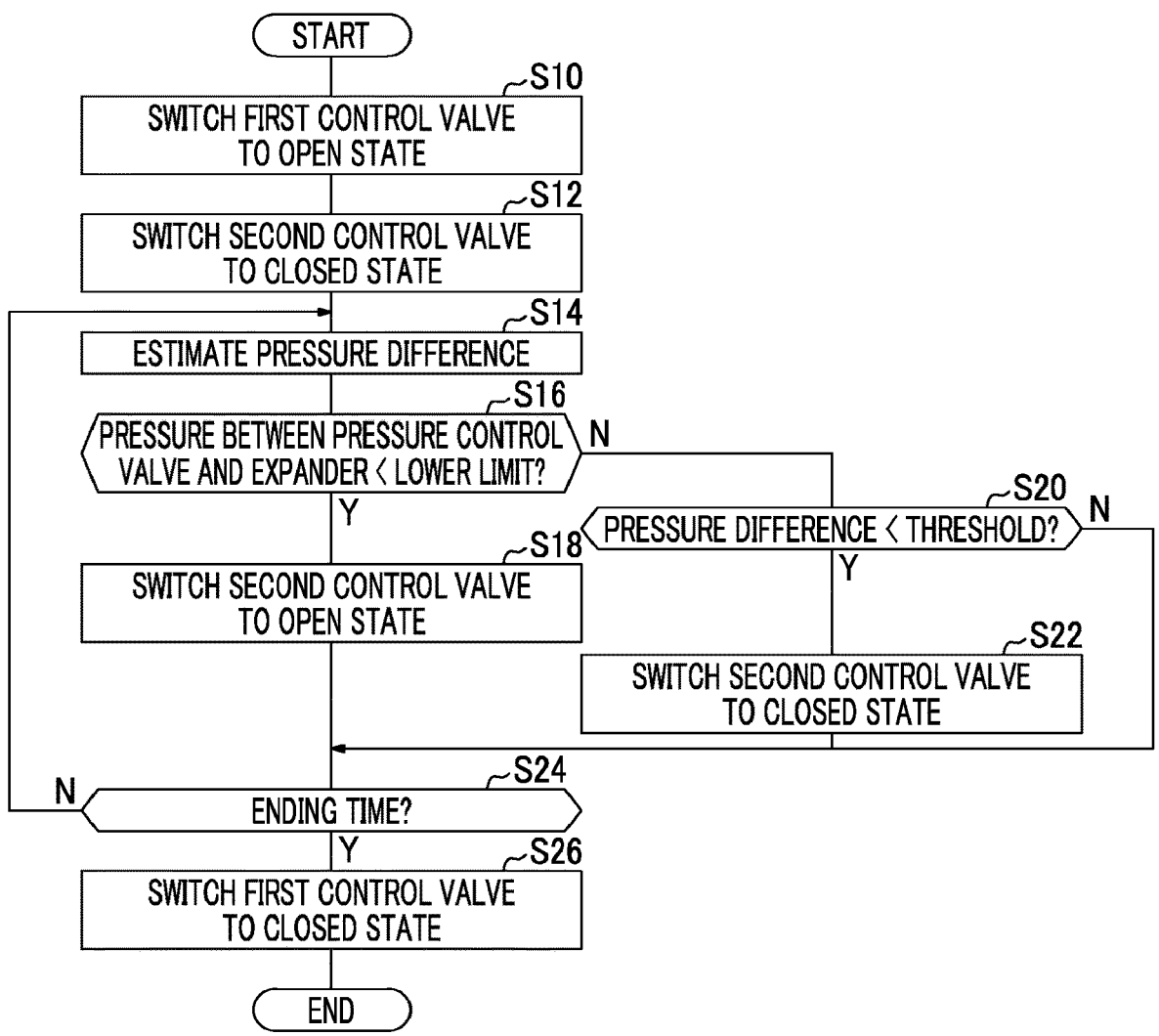
FIG. 3 is a flowchart illustrating an example of a flow of a control routine which is performed by the control device according to the first embodiment.

Operation of the fuel cell system 10 according to this embodiment will be described below with reference to FIGS. 3 and 4. FIG. 3 is a flowchart illustrating an example of a flow of a control routine which is performed by the ECU 60 of the control device 50 according to this embodiment. In this embodiment, the control routine is performed by causing the ECU 60 to execute a program stored in advance in the ROM. The control routine illustrated in FIG. 3 is performed, for example, when driving of the fuel cell stack 12 is started such as when a power switch which is not illustrated is turned on. The ECU 60 of the control device 50 serves as the estimation unit 52 and the control unit 54 illustrated in FIG. 1 by executing a program stored in advance in the ROM.

Figure 4:
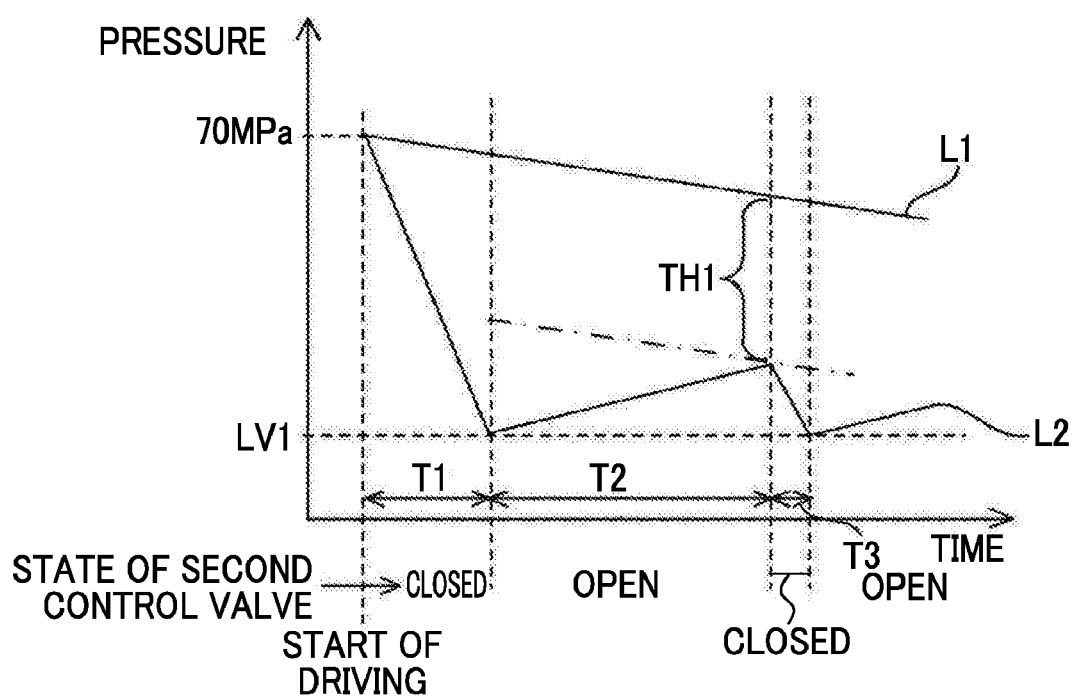
FIG. 4 is a graph illustrating an example of a time-series change of a pressure according to the first embodiment.

FIG. 4 is a graph illustrating an example of time-series changes of the pressure P1 which is measured by the first pressure sensor 20 and the pressure P2 between the pressure control valve 30 and the expander 24 which is estimated by the estimation unit 52. In FIG. 4, a solid line L1 denotes the pressure P1 and a solid line L2 denotes the pressure P2.

In Step S10 in FIG. 3, the control unit 54 performs control of switching the first control valve 18 to the open state. Then, in Step S12, the control unit 54 performs control of switching the second control valve 22 to the closed state. In Step S14, the estimation unit 52 acquires the pressure P1 which is measured by the first pressure sensor 20. The estimation unit 52 estimates the pressure P2 between the pressure control valve 30 and the expander 24 based on an amount of hydrogen injected from the injector 32, an amount of hydrogen remaining in the hydrogen tank 14, and the like. Then, the estimation unit 52 estimates a value obtained by subtracting the pressure P2 from the pressure P1 as the pressure difference PD.

Then, in Step S16, the control unit 54 determines whether the pressure P2 between the pressure control valve 30 and the expander 24 which is estimated by the process in Step S14 is less than the lower limit value LV1. The routine transitions to Step S20 when the determination result is negative, and the routine transitions to Step S18 when the determination result is positive.

In Step S18, the control unit 54 performs control of switching the second control valve 22 to the open state. When the second control valve 22 is already in the open state, the open state is maintained. When the process of Step S18 is completed, the routine transitions to Step S24. On the other hand, in Step S20, the control unit 54 determines whether the pressure difference PD estimated in the process of Step S14 is less than the threshold value TH1. When the determination result is positive, the routine transitions to Step S22. In Step S22, the control unit 54 performs control of switching the second control valve 22 to the closed state. When the second control valve 22 is already in the closed state, the closed state is maintained. When the process of Step S22 is completed, the routine transitions to Step S24.

When the determination result of Step S20 is negative, the process of Step S22 is not performed and the routine transitions to Step S24.

In Step S24, the control unit 54 determines whether a predetermined ending time has arrived. An example of the ending time is a time at which driving of the fuel cell stack 12 stops such as a time at which the power switch is turned off. The routine returns to Step S14 when the determination result of Step S24 is negative, and the routine transitions to Step S26 when the determination result is positive.

In Step S26, the control unit 54 performs control of switching the first control valve 18 to the closed state. When the process of Step S26 is completed, the control routine ends.

Through the above-mentioned control routine, for example, as illustrated in FIG. 4, when driving of the fuel cell stack 12 starts, first, the first control valve 18 is put in the open state and the second control valve 22 is put in the closed state through the processes of Steps S10 and S12. Through these processes, the pressure P2 between the pressure control valve 30 and the expander 24 starts decreasing. In a period T1 in which the pressure P2 between the pressure control valve 30 and the expander 24 is equal to or greater than the lower limit value LV1, the second control valve 22 is maintained in the closed state, the pressure P2 between the pressure control valve 30 and the expander 24 decreases, and a predetermined pressure difference PD is secured.

When the pressure P2 between the pressure control valve 30 and the expander 24 changes from a value equal to or greater than the lower limit value LV1 to a value less than the lower limit value LV1, the second control valve 22 is switched to the open state through the process of Step S18 and the pressure P2 between the pressure control valve 30 and the expander 24 increases. In a period T2 until the pressure difference PD is less than the threshold value TH1, the second control valve 22 is maintained in the open state, and expansion energy in the expander 24 based on the pressure difference PD in the period T2 is recovered by the energy recovery device 34.

Then, when the pressure difference PD changes from equal to or greater than the threshold value TH1 to less than the threshold value TH1, the second control valve 22 is switched to the closed state through the process of Step S22 and the pressure P2 between the pressure control valve 30 and the expander 24 decreases. In a period T3 in which the pressure difference PD is equal to or greater than the threshold value TH1 and until the pressure P2 between the pressure control valve 30 and the expander 24 is less than the lower limit value LV1, the second control valve 22 is maintained in the closed state, the pressure P2 between the pressure control valve 30 and the expander 24 decreases, and a predetermined pressure difference PD is secured. Thereafter, the period T2 and the period T3 are alternately repeated until driving of the fuel cell stack 12 stops.

As described above, according to this embodiment, the pressure difference PD equal to or greater than the threshold value TH1 is secured by switching the second control valve 22 to the closed state when the pressure difference PD is less than the threshold value TH1. Accordingly, it is possible to efficiently recover expansion energy of hydrogen in the expander 24.

In this embodiment, the second control valve 22 is switched to the open state when the pressure P2 between the pressure control valve 30 and the expander 24 is less than the lower limit value LV1, but the disclosure is not limited to this example. When the pressure difference PD is equal to or greater than a threshold value TH2 greater than the threshold value TH1, supply of hydrogen to the expander 24 may be started by switching the second control valve 22 to the open state.

In this embodiment, the supply of hydrogen to the expander 24 is intercepted when the second control valve 22 is put in the closed state, but the disclosure is not limited to this case. For example, when the second control valve 22 is put in the closed state, an amount of hydrogen supplied to the expander 24 may become less than that when the second control valve 22 is put in the open state.

Second Embodiment

A second embodiment will be described below. The same elements as in the first embodiment will be referred to by the same reference signs and description thereof will not be repeated.

Figure 5:
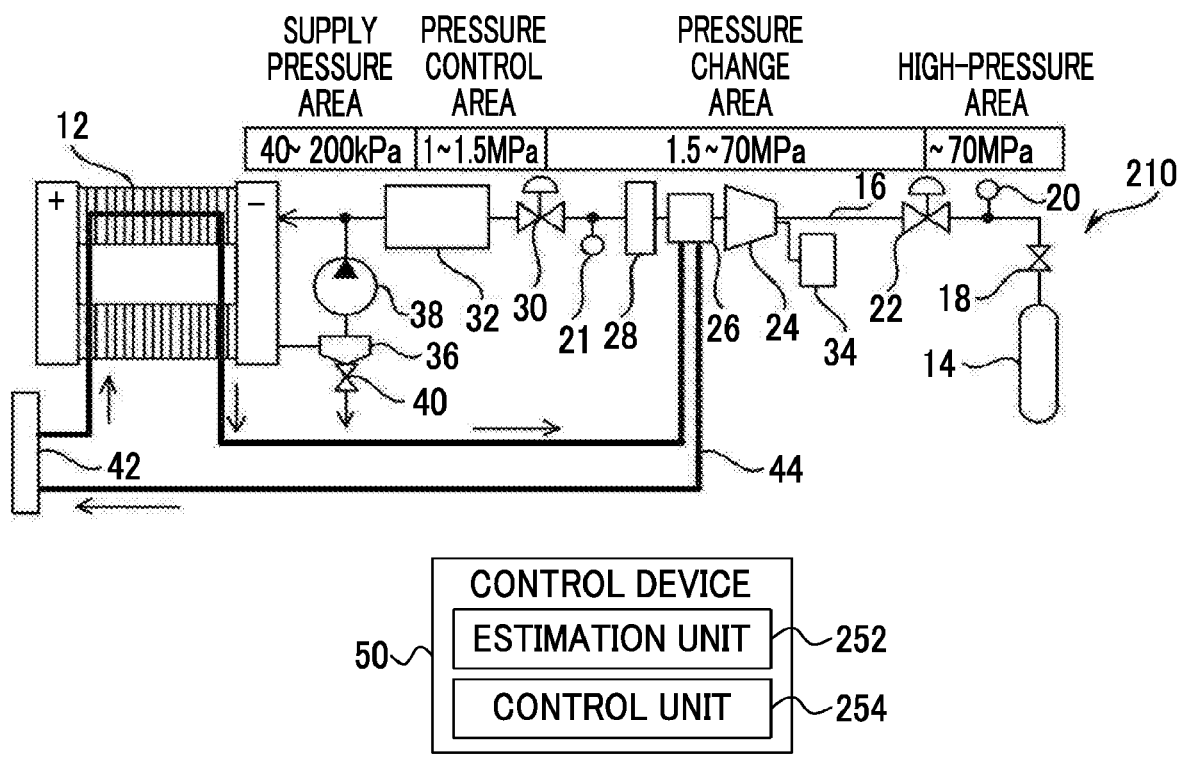
FIG. 5 is a diagram schematically illustrating an example of a configuration of a fuel cell system according to a second embodiment.

A configuration of a fuel cell system 210 according to this embodiment will be described below with reference to FIG. 5. As illustrated in FIG. 5, the fuel cell system 210 further includes a second pressure sensor 21. The second pressure sensor 21 is provided between the sub tank 28 and the pressure control valve 30 in the supply path 16 and measures a pressure between the sub tank 28 and the pressure control valve 30. The control device 50 functionally includes an estimation unit 252 and a control unit 254.

The estimation unit 252 estimates a pressure difference PD between a pressure P1 upstream from the expander 24 and a pressure P2 downstream therefrom. In this embodiment, the estimation unit 252 uses a pressure measured by the first pressure sensor 20 as the pressure P1. The estimation unit 252 uses a pressure measured by the second pressure sensor 21 as the pressure P2. The estimation unit 252 estimates a value obtained by subtracting the pressure P2 from the pressure P1 as the pressure difference PD. The control unit 254 starts supply of hydrogen to the expander 24 by performing control of switching the second control valve 22 to the open state when the pressure P2 measured by the second pressure sensor 21 is less than the lower limit value LV1.

When the pressure difference PD is less than the threshold value TH1 while a high-load command is being input from an ECU (not illustrated) different from the ECU 60, the control unit 254 performs control of switching the second control valve 22 to the closed state similarly to the control unit 54 in the first embodiment. On the other hand, when a high-load command is not input and the pressure measured by the second pressure sensor 21 is equal to or greater than an upper limit value UV1, the control unit 254 performs control of switching the second control valve 22 to the closed state. An example of the upper limit value UV1 in this case is a predetermined value within a range which is greater than the lower limit value LV1 and less than the pressure P1 measured by the first pressure sensor 20. The high-load command is input to the ECU 60, for example, when the load is equal to or greater than a predetermined load such as when a state in which an accelerator operation amount of a vehicle is equal to or greater than a predetermined value is maintained for a predetermined period or more.

Figure 6:
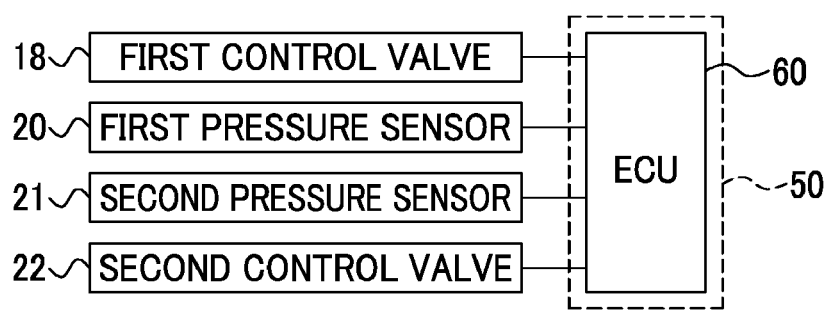
FIG. 6 is a block diagram illustrating an example of a hardware configuration of a control device according to the second embodiment.

A hardware configuration of the control device 50 will be described below with reference to FIG. 6. As illustrated in FIG. 6, the second pressure sensor 21 is additionally connected to the ECU 60.

Figure 7:
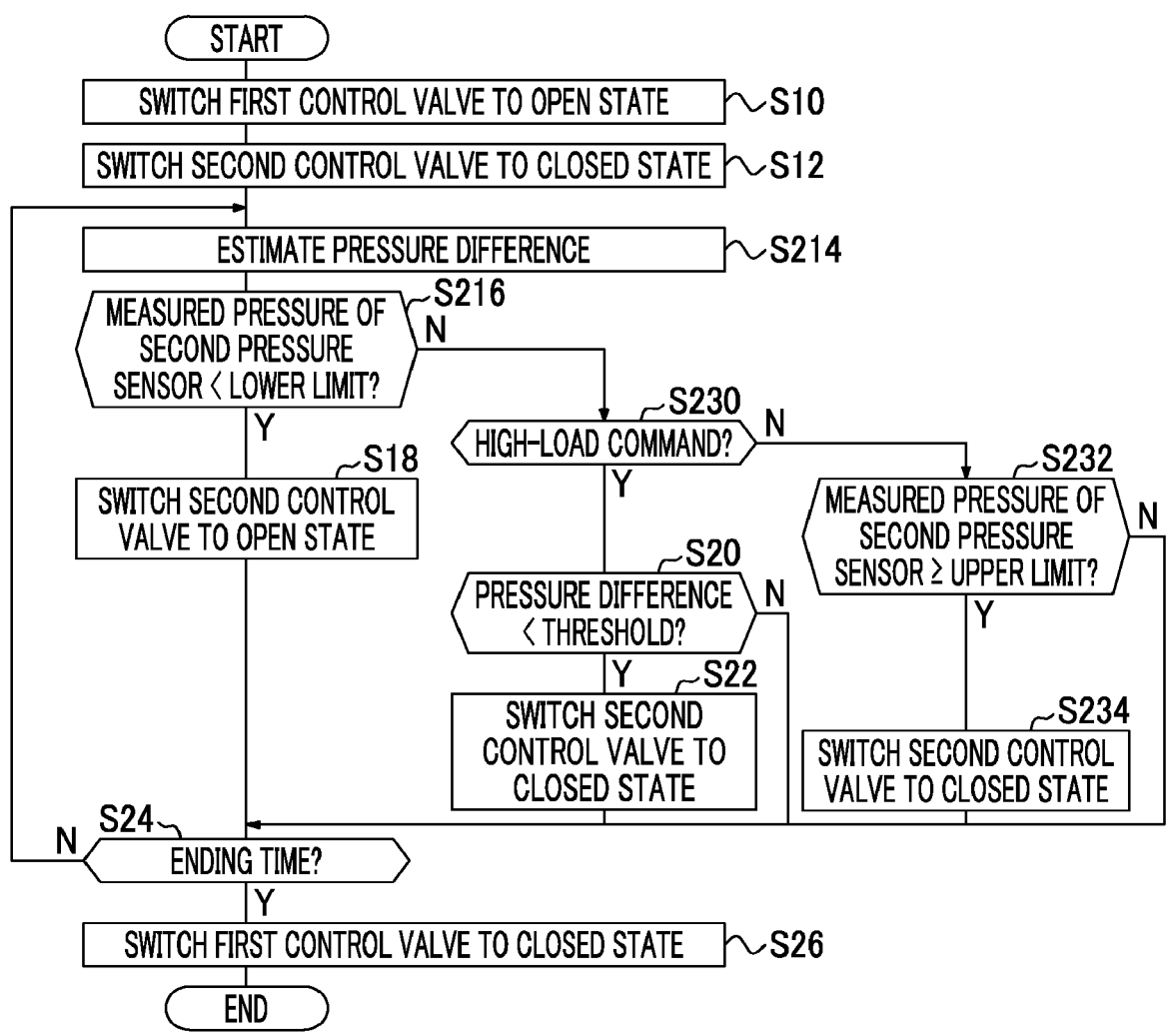
FIG. 7 is a flowchart illustrating an example of a flow of a control routine which is performed by the control device according to the second embodiment.

The operation of the fuel cell system 210 according to this embodiment will be described below with reference to FIGS. 7 and 8. FIG. 7 is a flowchart illustrating an example of a flow of a control routine which is performed by the ECU 60 of the control device 50 according to this embodiment. In this embodiment, the control routine is performed by causing the ECU 60 to execute a program which is stored in advance in the ROM. The control routine illustrated in FIG. 7 is performed, for example, when driving of the fuel cell stack 12 is started such as when a power switch which is not illustrated is turned on. The ECU 60 of the control device 50 serves as the estimation unit 252 and the control unit 254 illustrated in FIG. 5 by executing a program which is stored in advance in the ROM. The steps in FIG. 7 in which the same processes as in FIG. 3 are performed will be referred to by the same step numbers and description thereof will not be repeated.

Figure 8:
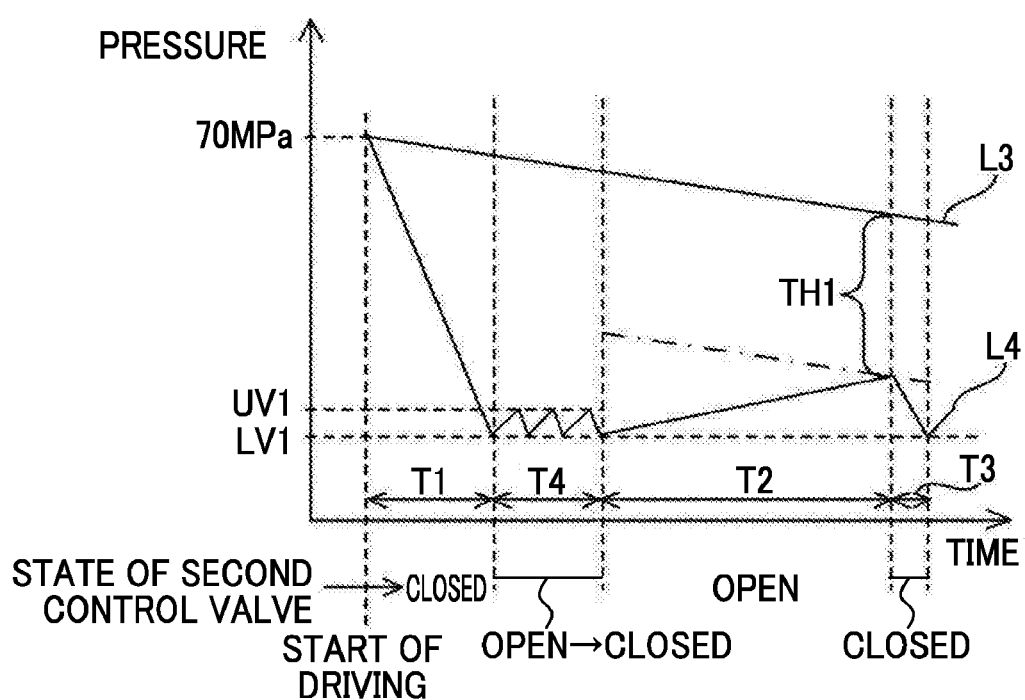
FIG. 8 is a graph illustrating an example of a time-series change of a pressure according to the second embodiment.

FIG. 8 is a graph illustrating an example of time-series changes of the pressure P1 measured by the first pressure sensor 20 and the pressure P2 measured by the second pressure sensor 21. A solid line L3 in FIG. 8 denotes the pressure P1 measured by the first pressure sensor 20 and a solid line L4 denotes the pressure P2 measured by the second pressure sensor 21. In the example illustrated in FIG. 8, periods T1 and T4 are periods in which a high-load command is not input, and periods T2 and T3 are periods in which a high-load command is input.

In Step S214 of FIG. 7, the estimation unit 252 acquires pressures measured by the first pressure sensor 20 and the second pressure sensor 21. Then, the estimation unit 252 estimates a value, which is obtained by subtracting the pressure P2 measured by the second pressure sensor 21 from the pressure P1 measured by the first pressure sensor 20 as the pressure difference PD.

In Step S216, the control unit 254 determines whether the pressure P2 which is acquired in Step S214 and measured by the second pressure sensor 21 is less than the lower limit value LV1. The routine transitions to Step S18 when the determination result thereof is positive, and the routine transitions to Step S230 when the determination result thereof is negative.

In Step S230, the control unit 254 determines whether the high-load command has been input. The routine transitions to Step S20 when the determination result thereof is positive, and the routine transitions to Step S232 when the determination result thereof is negative. In Step S232, the control unit 254 determines whether the pressure P2 which is acquired in Step S214 and measured by the second pressure sensor 21 is equal to or greater than the upper limit value UV1. The routine transitions to Step S234 when the determination result thereof is positive. In Step S234, the control unit 254 performs control of switching the second control valve 22 to the closed state. When the process of Step S234 is completed, the routine transitions to Step S24. When the determination result of Step S232 is negative, the process of Step S234 is not performed and the routine transitions to Step S24.

Through the above-mentioned control routine, for example, as illustrated in FIG. 8, the pressures change in the periods T1, T2, and T3 in the same way as in the first embodiment. On the other hand, in the period T4 in which the high-load command is not input, ON and OFF of the second control valve 22 are repeated such that the pressure P2 measured by the second pressure sensor 21 is in a range which is equal to or greater than the lower limit value LV1 and less than the upper limit value UV1.

As described above, according to this embodiment, it is possible to recover expansion energy of hydrogen in the expander 24 in the period in which the high-load command is not input and to keep the pressure difference PD at a time point at which the high-load command is input relatively high. Accordingly, it is possible to efficiently recover expansion energy of hydrogen in the expander 24.

Third Embodiment

A third embodiment will be described below. The same elements as in the second embodiment will be referred to by the same reference signs and description thereof will not be repeated.

Figure 9:
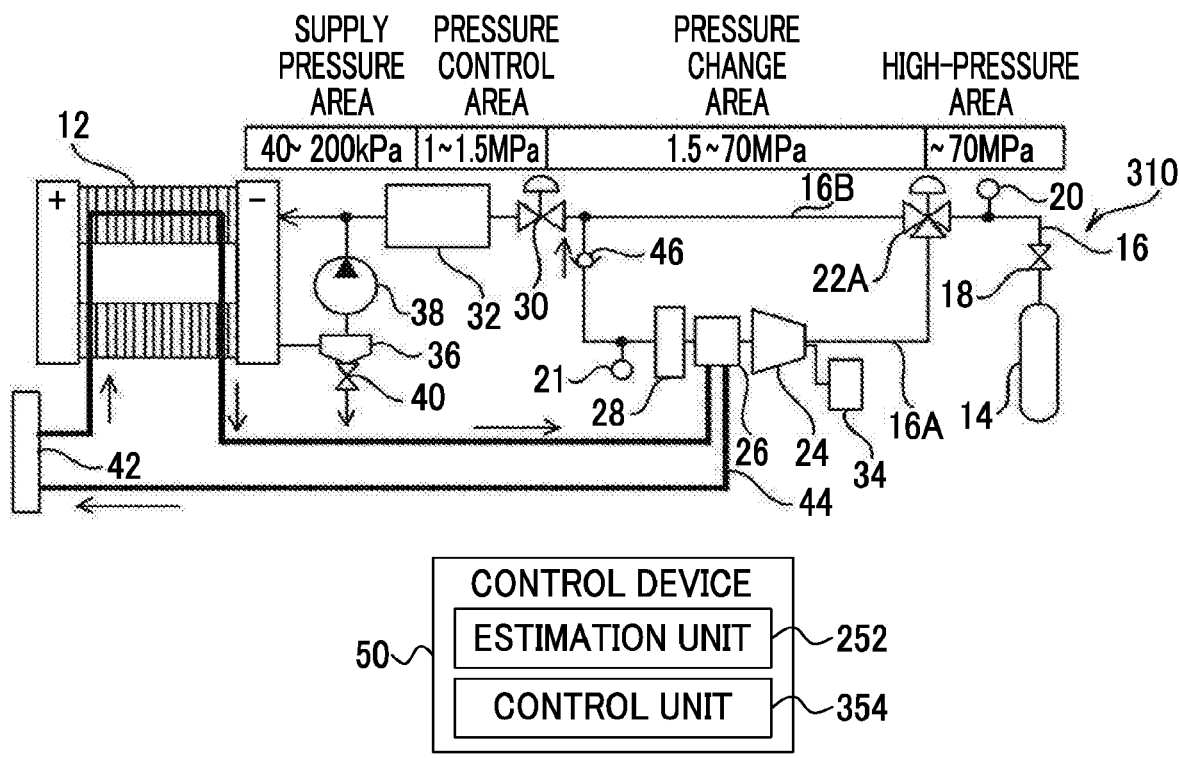
FIG. 9 is a diagram schematically illustrating an example of a configuration of a fuel cell system according to a third embodiment.
Figure 10:
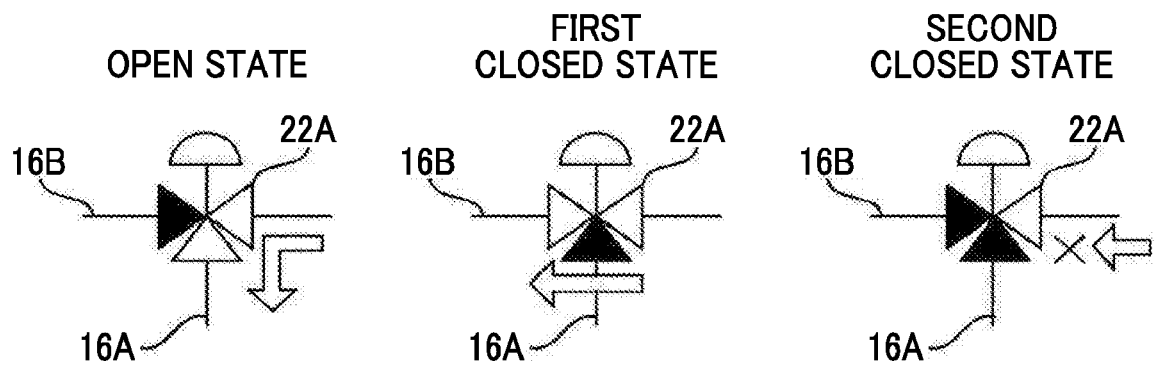
FIG. 10 is a diagram illustrating an example of states to which a second control valve can be switched according to the third embodiment.

A configuration of a fuel cell system 310 according to this embodiment will be described below with reference to FIGS. 9 and 10. As illustrated in FIG. 9, the fuel cell system 310 includes a second control valve 22A instead of the second control valve 22 in the second embodiment. The fuel cell system 310 additionally includes a check valve 46.

In the fuel cell system 310 according to this embodiment, a bypass path that bypasses the expander 24 from upstream to downstream is provided in the supply path 16. In the following description, in order to avoid complication, a path between a portion connected to one end on the upstream side of the bypass path and a portion connected to the other end on the downstream side thereof in the supply path 16 is referred to as a first supply path 16A, and the bypass path is referred to as a second supply path 16B. In the first supply path 16A, an expander 24, a heat exchanger 26, a sub tank 28, a second pressure sensor 21, and a check valve 46 are arranged in this order from upstream to downstream. In this embodiment, the first supply path 16A and the second supply path 16B join each other upstream from the pressure control valve 30. The check valve 46 is provided to prevent a back flow of hydrogen to the sub tank 28.

In the fuel cell system 310, the second control valve 22A which is a three-way valve is provided in a portion connected to one end on the upstream side of the second supply path 16B in the supply path 16. The second control valve 22A in this embodiment is a valve which is switched to one of an open state, a first closed state, and a second closed state as illustrated in FIG. 10. The open state is a state in which supply of hydrogen to the second supply path 16B is intercepted and hydrogen is supplied to the first supply path 16A (that is, the expander 24). The first closed state is a state in which hydrogen is supplied to the second supply path 16B and supply of hydrogen to the first supply path 16A is intercepted. The second closed state is a state in which supply of hydrogen to both the first supply path 16A and the second supply path 16B is intercepted.

The control device 50 functionally includes an estimation unit 252 and a control unit 354. When the pressure P1 measured by the first pressure sensor 20 is less than a predetermined threshold value TH3, the control unit 354 performs control of switching the second control valve 22A to the first closed state. When the pressure P1 measured by the first pressure sensor 20 is equal to or greater than the threshold value TH3, the control unit 354 performs the same control as performed by the control unit 254 in the second embodiment.

Since the second control valve 22 in the second embodiment has only to be replaced with the second control valve 22A, the hardware configuration of the control device 50 will not be repeatedly described.

Figure 11:
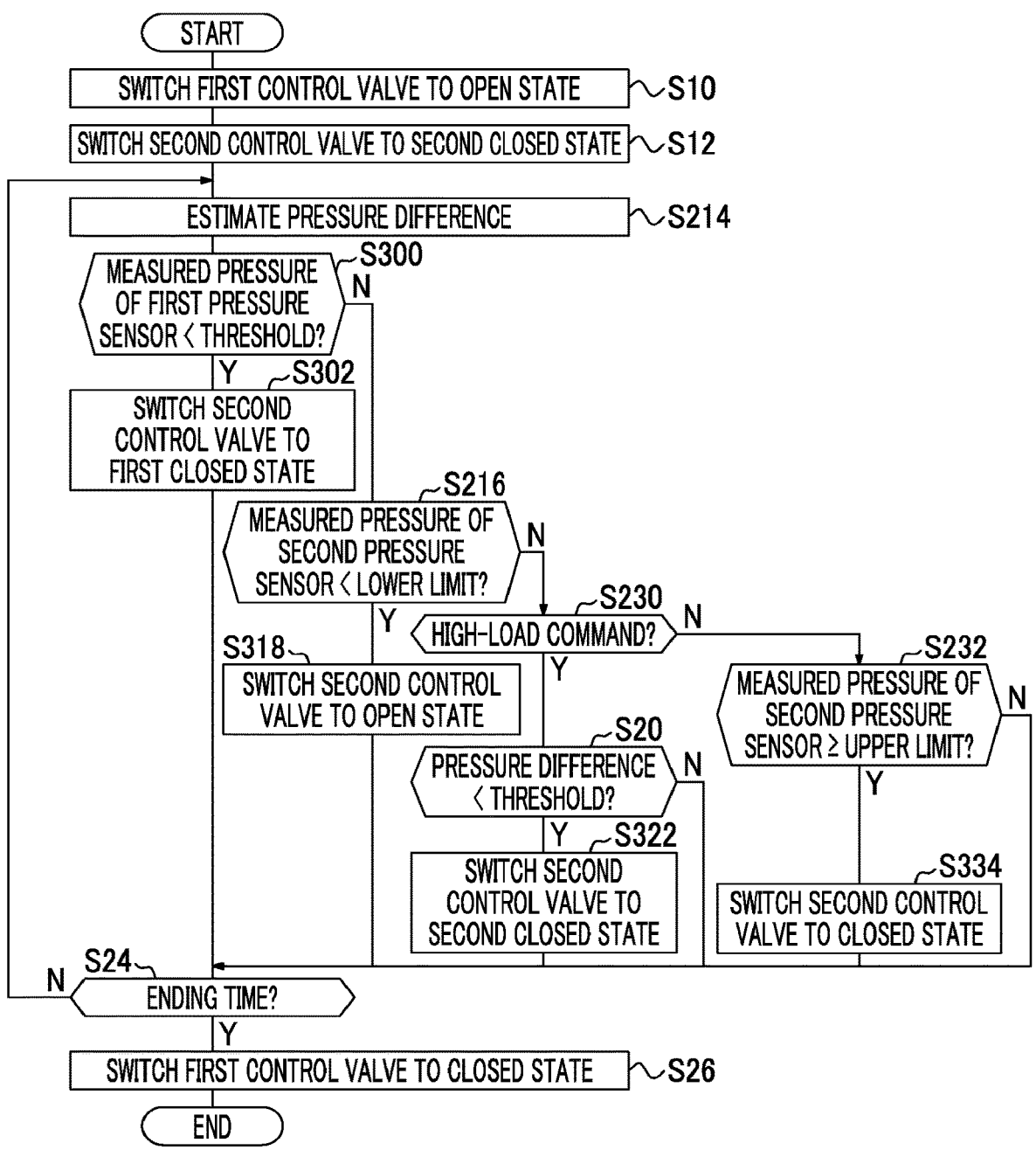
FIG. 11 is a flowchart illustrating an example of a flow of a control routine which is performed by a control device according to the third embodiment.

The operation of the fuel cell system 310 according to this embodiment will be described below with reference to FIG. 11. FIG. 11 is a flowchart illustrating an example of a flow of a control routine which is performed by the ECU 60 of the control device 50 according to this embodiment. In this embodiment, the control routine is performed by causing the ECU 60 to execute a program which is stored in advance in the ROM. The control routine illustrated in FIG. 11 is performed, for example, when driving of the fuel cell stack 12 is started such as when a power switch which is not illustrated is turned on. The ECU 60 of the control device 50 serves as the estimation unit 252 and the control unit 354 illustrated in FIG. 9 by executing a program which is stored in advance in the ROM. The steps in FIG. 11 in which the same processes as in FIG. 7 are performed will be referred to by the same step numbers and description thereof will not be repeated.

In Step S300 of FIG. 11, the control unit 354 determines whether the pressure P1 which is acquired in Step S214 and measured by the first pressure sensor 20 is less than the threshold value TH3. The routine transitions to Step S216 when the determination result thereof is negative, and the routine transitions to Step S302 when the determination result thereof is positive.

In Step S302, the control unit 354 performs control of switching the second control valve 22A to the first closed state. When the second control valve 22A is already in the first closed state, the first closed state is maintained. When the process of Step S302 is completed, the routine transitions to Step S24.

On the other hand, in Step S318, the control unit 254 performs control of switching the second control valve 22A to the open state. When the second control valve 22A is already in the open state, the open state is maintained. In Steps S322 and S334, the control unit 254 performs control of switching the second control valve 22A to the second closed state. When the second control valve 22A is put in the second closed state, the second closed state is maintained.

As described above, according to this embodiment, the same advantages as in the second embodiment can be achieved, and it is possible to stabilize the operation of the fuel cell system 310 by supplying hydrogen to the fuel cell stack 12 using the supply path not including the expander 24 even when the internal pressure of the hydrogen tank 14 is relatively low.

Fourth Embodiment

A fourth embodiment will be described below. The same elements as in the third embodiment will be referred to by the same reference signs and description thereof will not be repeated.

Figure 12:
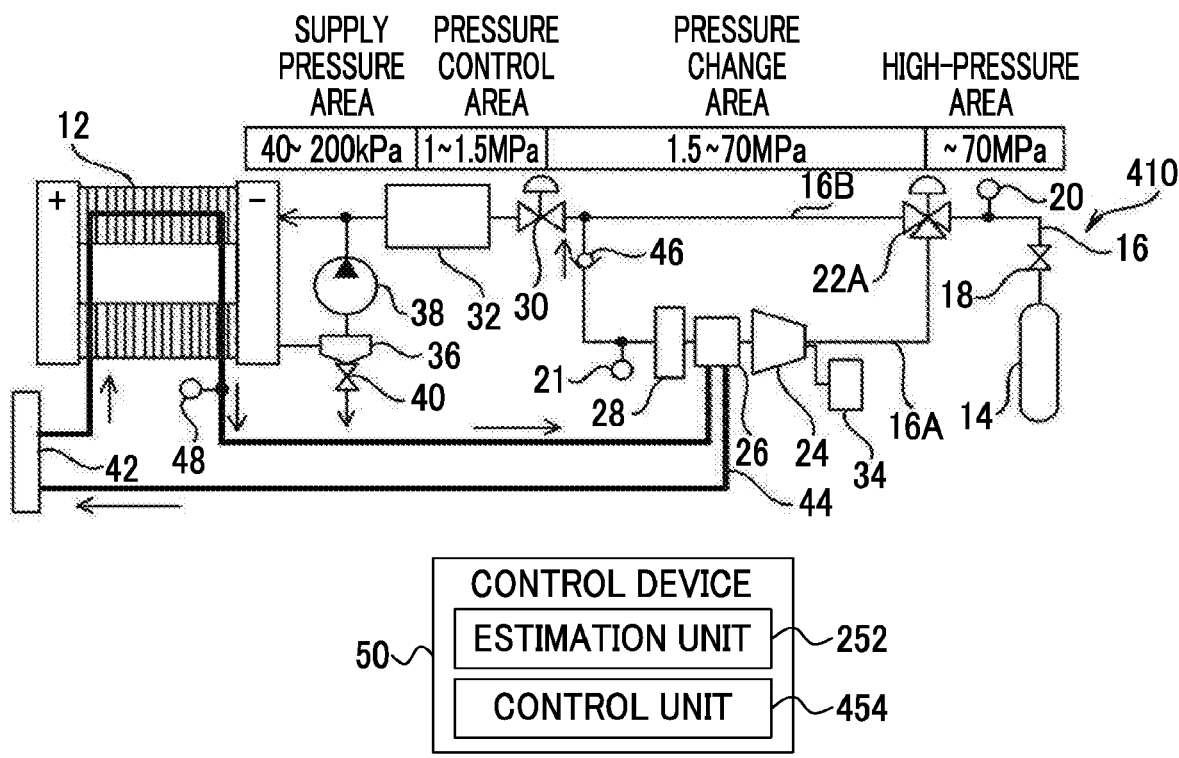
FIG. 12 is a diagram schematically illustrating an example of a configuration of a fuel cell system according to a fourth embodiment.

A configuration of a fuel cell system 410 according to this embodiment will be described below with reference to FIG. 12. As illustrated in FIG. 12, the fuel cell system 410 additionally includes a temperature sensor 48 that measures a temperature of a coolant flowing in the coolant circulation passage 44. The control device 50 functionally includes an estimation unit 252 and a control unit 454.

When the temperature measured by the temperature sensor 48 is equal to or lower than a predetermined temperature threshold value, the control unit 454 performs control of switching the second control valve 22A to the first closed state. When the temperature measured by the temperature sensor 48 is higher than the temperature threshold value, the control unit 454 performs the same control as performed by the control unit 354 in the third embodiment.

Figure 13:
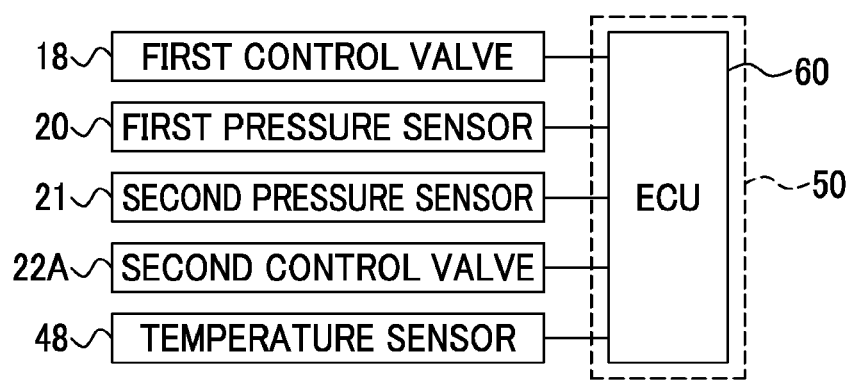
FIG. 13 is a block diagram illustrating an example of a hardware configuration of a control device according to the fourth embodiment.

A hardware configuration of the control device 50 will be described below with reference to FIG. 13. As illustrated in FIG. 13, the temperature sensor 48 is additionally connected to the ECU 60.

Figure 14:
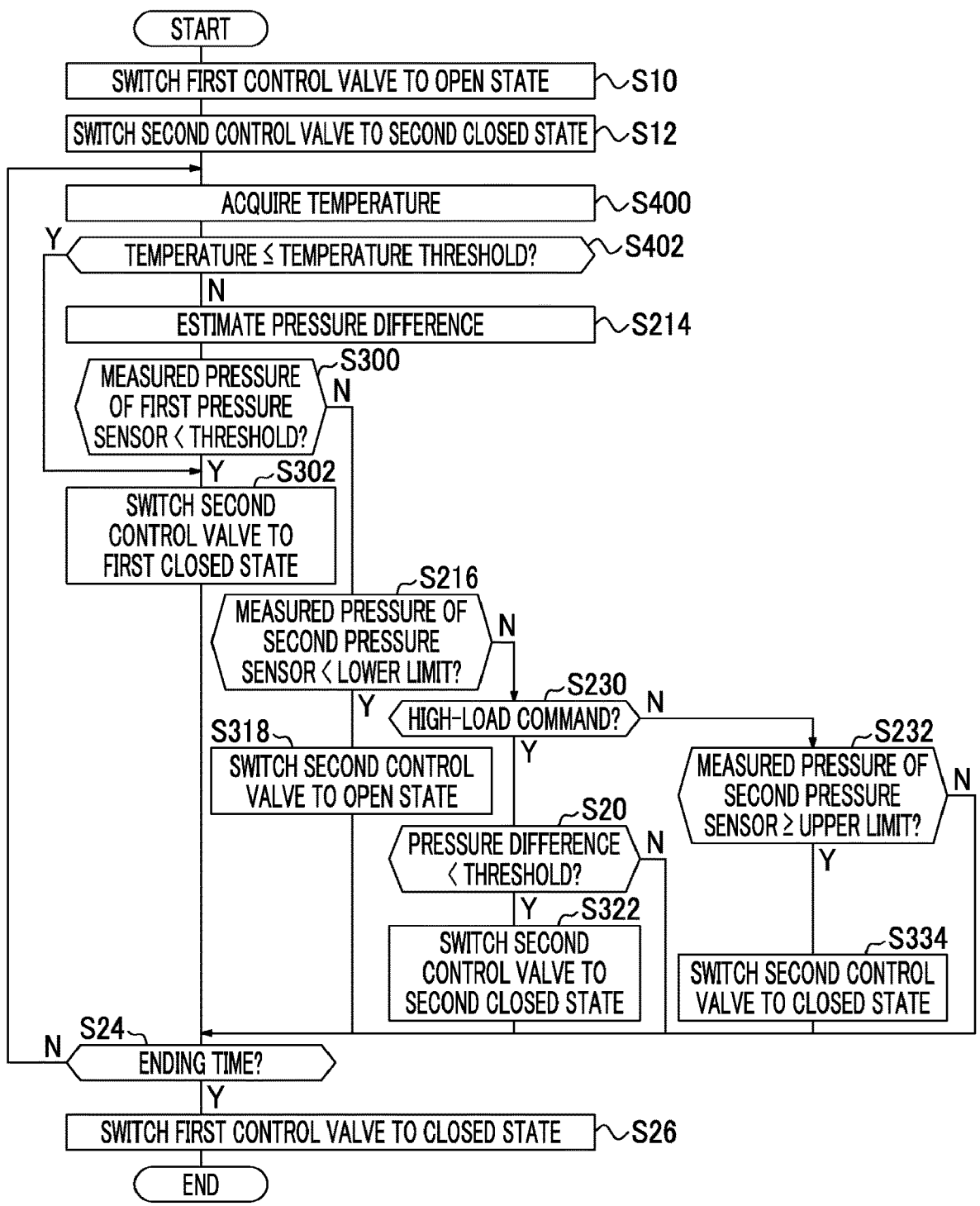
FIG. 14 is a flowchart illustrating an example of a flow of a control routine which is performed by the control device according to the fourth embodiment.

The operation of the fuel cell system 410 according to this embodiment will be described below with reference to FIG. 14. FIG. 14 is a flowchart illustrating an example of a flow of a control routine which is performed by the ECU 60 of the control device 50 according to this embodiment. In this embodiment, the control routine is performed by causing the ECU 60 to execute a program which is stored in advance in the ROM. The control routine illustrated in FIG. 14 is performed, for example, when driving of the fuel cell stack 12 is started such as when a power switch which is not illustrated is turned on. The ECU 60 of the control device 50 serves as the estimation unit 252 and the control unit 454 illustrated in FIG. 12 by executing a program which is stored in advance in the ROM. The steps in FIG. 14 in which the same processes as in FIG. 11 are performed will be referred to by the same step numbers and description thereof will not be repeated.

In Step S400 of FIG. 14, the control unit 454 acquires the temperature measured by the temperature sensor 48. In Step S402, the control unit 454 determines whether the temperature acquired in Step S400 is equal to or lower than the temperature threshold value. The routine transitions to Step S302 when the determination result thereof is positive, and the routine transitions to Step S214 when the determination result thereof is negative.

As described above, according to this embodiment, the same advantages as in the third embodiment can be achieved. According to this embodiment, when the temperature of the coolant for cooling the fuel cell stack 12 is equal to or lower than the temperature threshold value, supply of hydrogen to the first supply path 16A is intercepted by switching the second control valve 22A to the first closed state, and hydrogen is supplied to the second supply path 16B. Accordingly, in this case, since heat exchange is not performed by the heat exchanger 26, the coolant is not cooled and thus it is possible to curb supercooling of the fuel cell stack 12.

Fifth Embodiment

A fifth embodiment will be described below. The same elements as in the fourth embodiment will be referred to by the same reference signs and description thereof will not be repeated.

Figure 15:
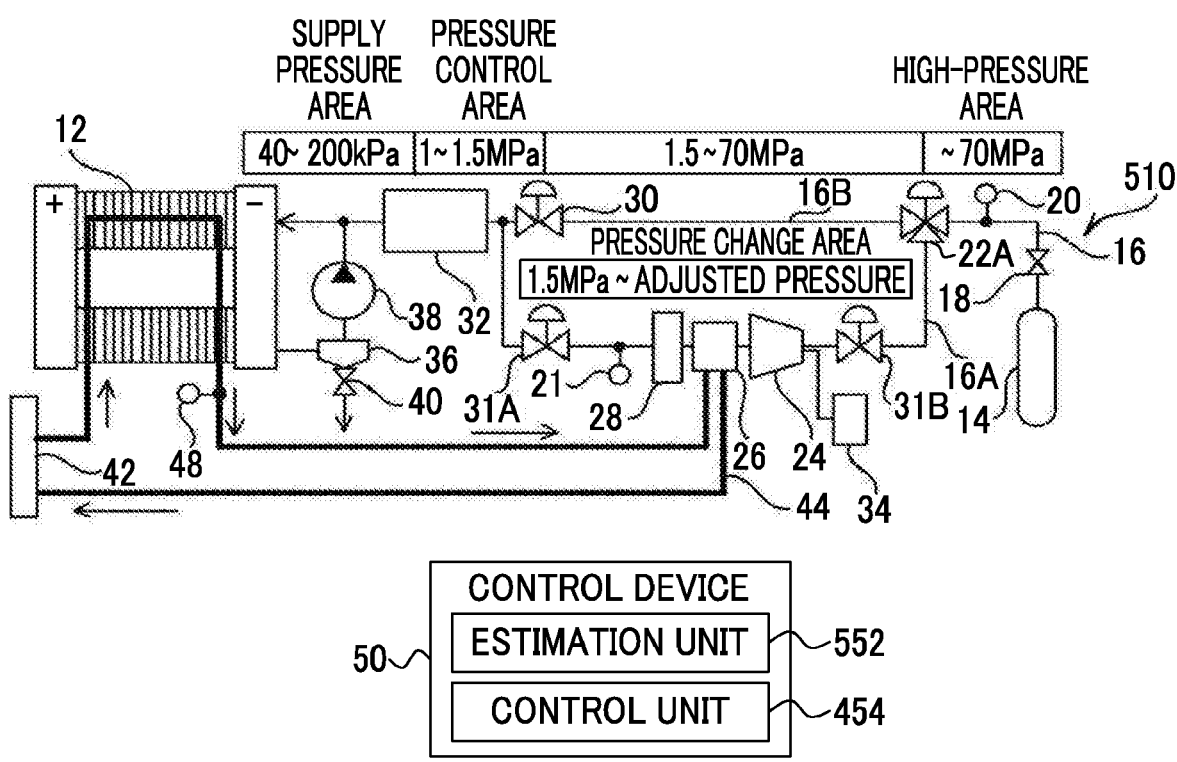
FIG. 15 is a diagram schematically illustrating an example of a configuration of a fuel cell system according to a fifth embodiment.

A configuration of a fuel cell system 510 according to this embodiment will be described below with reference to FIG. 15. As illustrated in FIG. 15, the fuel cell system 510 includes a pressure control valve 30 provided in the second supply path 16B. A second pressure control valve 31A which is the same type as the pressure control valve 30 is provided downstream from the second pressure sensor 21 in the first supply path 16A. A third pressure control valve 31B that decompresses hydrogen flowing therein is provided upstream from the expander 24 in the first supply path 16A. The first supply path 16A and the second supply path 16B join each other upstream from the injector 32.

The control device 50 functionally includes an estimation unit 552 and a control unit 454. The estimation unit 552 estimates a pressure difference PD between a pressure P1 upstream from the expander 24 and a pressure P2 downstream therefrom. In this embodiment, the estimation unit 552 uses a pressure decompressed by the third pressure control valve 31B as the pressure P1. The pressure P1 is determined in advance, for example, on the basis of design specifications of the third pressure control valve 31B. The estimation unit 552 uses a pressure measured by the second pressure sensor 21 as the pressure P2. The estimation unit 552 estimates a value, which is obtained by subtracting the pressure P2 from the pressure P1, as the pressure difference PD.

The hardware configuration of the control device 50 according to this embodiment is the same as in the fourth embodiment and thus description thereof will not be repeated.

The operation of the fuel cell system 510 according to this embodiment is different from that according to the fourth embodiment in that the pressure decreased by the third pressure control valve 31B is used as the pressure P1 upstream from the expander 24 instead of the pressure measured by the first pressure sensor 20, and thus description thereof will not be repeated.

As described above, according to this embodiment, the upper limit value of the pressure P1 upstream from the expander 24 is set to a value lower than that in the fourth embodiment by the third pressure control valve 31B. Accordingly, it is possible to stabilize the output of the expander 24 and to reduce the change in pressure to the expander 24 when the second control valve 22A is opened and closed.

Figure 16:
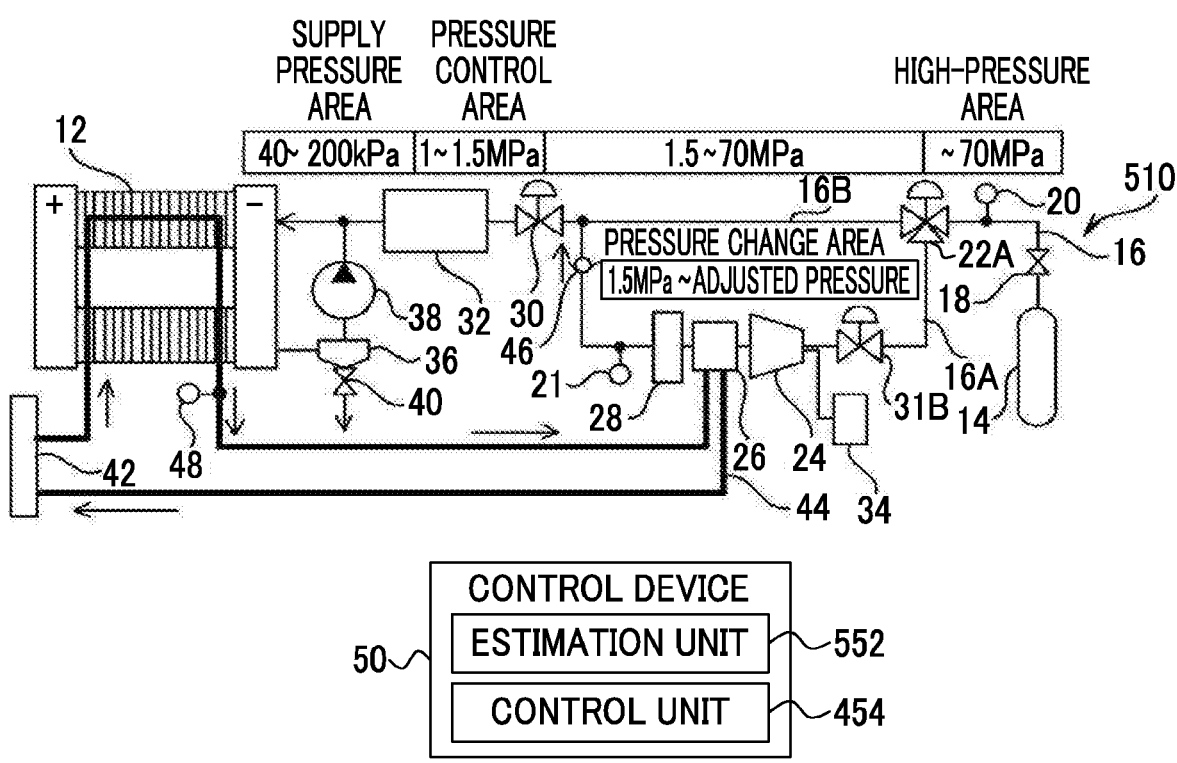
FIG. 16 is a diagram schematically illustrating an example of a configuration of a fuel cell system according to a modified example.
Figure 17:
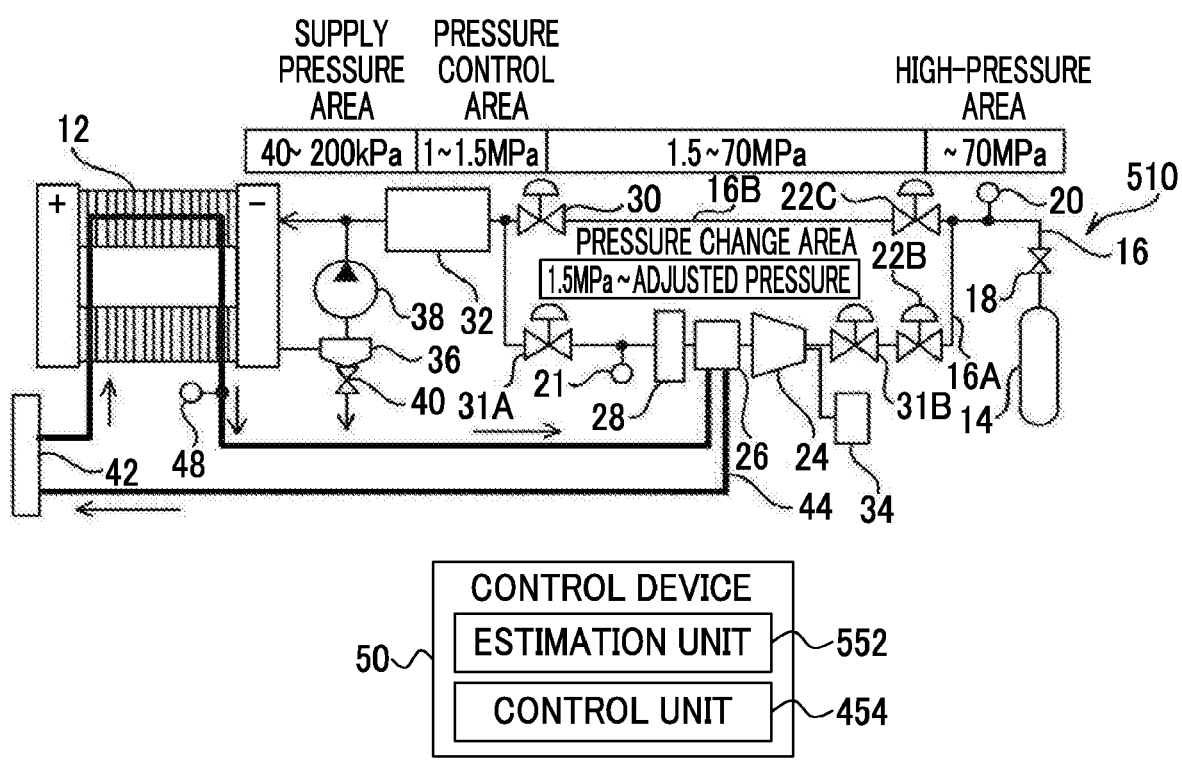
FIG. 17 is a diagram schematically illustrating an example of a configuration of a fuel cell system according to a modified example.

For example, as illustrated in FIG. 16, the check valve 46 may be provided in the first supply path 16A and the first supply path 16A and the second supply path 16B may join each other upstream from the pressure control valve 30, similarly to the fourth embodiment. For example, as illustrated in FIG. 17, a second control valve 22B which is the same type of two-way valve as the second control valve 22 may be provided in the first supply path 16A and a second control valve 22C may be provided in the second supply path 16B, instead of the second control valve 22A. In this case, a state in which the second control valve 22B is put in the open state and the second control valve 22C is put in the closed state corresponds to the open state of the second control valve 22A. A state in which the second control valve 22B is put in the closed state and the second control valve 22C is put in the open state corresponds to the first closed state of the second control valve 22A. A state in which both the second control valves 22B and 22C are in the closed state corresponds to the second closed state of the second control valve 22A. In the example illustrated in FIG. 17, the position of the second control valve 22B and the position of the third pressure control valve 31B may be reversed.

Sixth Embodiment

A sixth embodiment will be described below. The same elements as in the fifth embodiment will be referred to by the same reference signs and description thereof will not be repeated.

Figure 18:
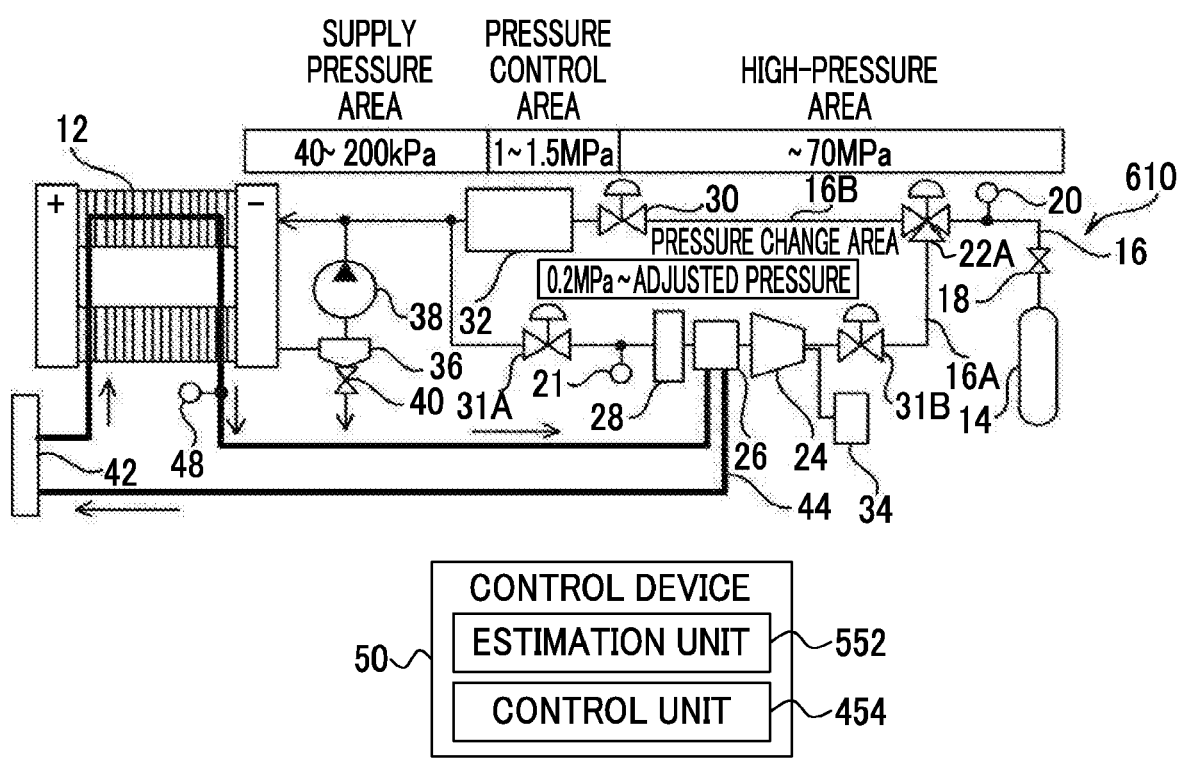
FIG. 18 is a diagram schematically illustrating an example of a configuration of a fuel cell system according to a sixth embodiment.

A configuration of a fuel cell system 610 according to this embodiment will be described below with reference to FIG. 18. As illustrated in FIG. 18, in the fuel cell system 610 according to this embodiment, the first supply path 16A and the second supply path 16B join each other downstream from the injector 32. That is, in this embodiment, the lower limit value of the pressure downstream from the expander 24 is set to a value smaller than that in the fifth embodiment.

The hardware configuration of the control device 50 according to this embodiment is the same as in the fifth embodiment and thus description thereof will not be repeated.

The operation of the fuel cell system 610 according to this embodiment is the same as the fuel cell system according to the fifth embodiment, except that the lower limit value LV1 is set to a value smaller than that in the fifth embodiment, and thus description thereof will not be repeated.

As described above, according to this embodiment, since the lower limit value of the pressure downstream from the

Seventh Embodiment

A seventh embodiment will be described below. The same elements as in the sixth embodiment will be referred to by the same reference signs and description thereof will not be repeated.

Figure 19:
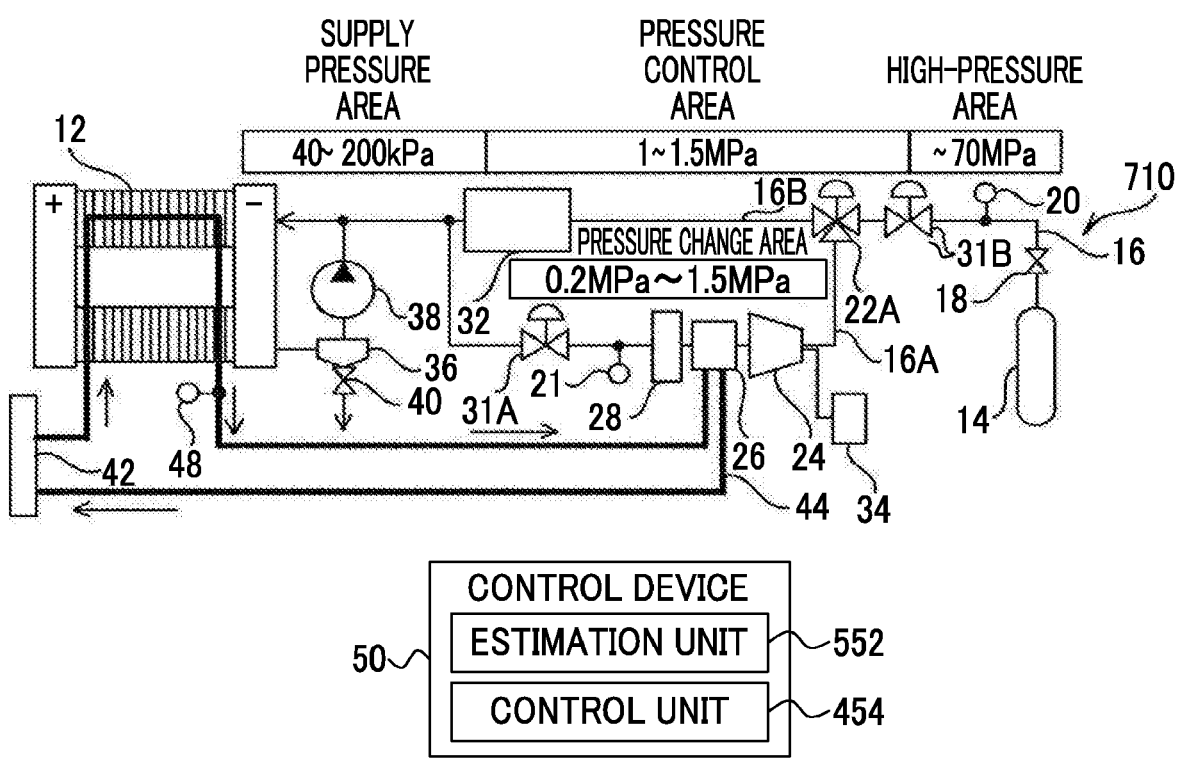
FIG. 19 is a diagram schematically illustrating an example of a configuration of a fuel cell system according to a seventh embodiment.

A configuration of a fuel cell system 710 according to this embodiment will be described below with reference to FIG. 19. As illustrated in FIG. 19, in the fuel cell system 710 according to this embodiment, the third pressure control valve 31B is provided upstream from the second control valve 22A in the supply path 16. That is, in this embodiment, the upper limit value of the pressure flowing in the second control valve 22A is set to a value smaller than that in the sixth embodiment. An injector 32 is provided in the second supply path 16B.

The hardware configuration of the control device 50 according to this embodiment is the same as in the sixth embodiment and thus description thereof will not be repeated.

The operation of the fuel cell system 710 according to this embodiment is the same as that in the sixth embodiment and thus description thereof will not be repeated.

As described above, according to this embodiment, since high-pressure hydrogen is not used, it is possible to realize high sealing ability of the expander 24 and thus to decrease the size of the fuel cell system 710.

Eighth Embodiment

An eighth embodiment will be described below. The same elements as in the fifth embodiment will be referred to by the same reference signs and description thereof will not be repeated.

Figure 20:
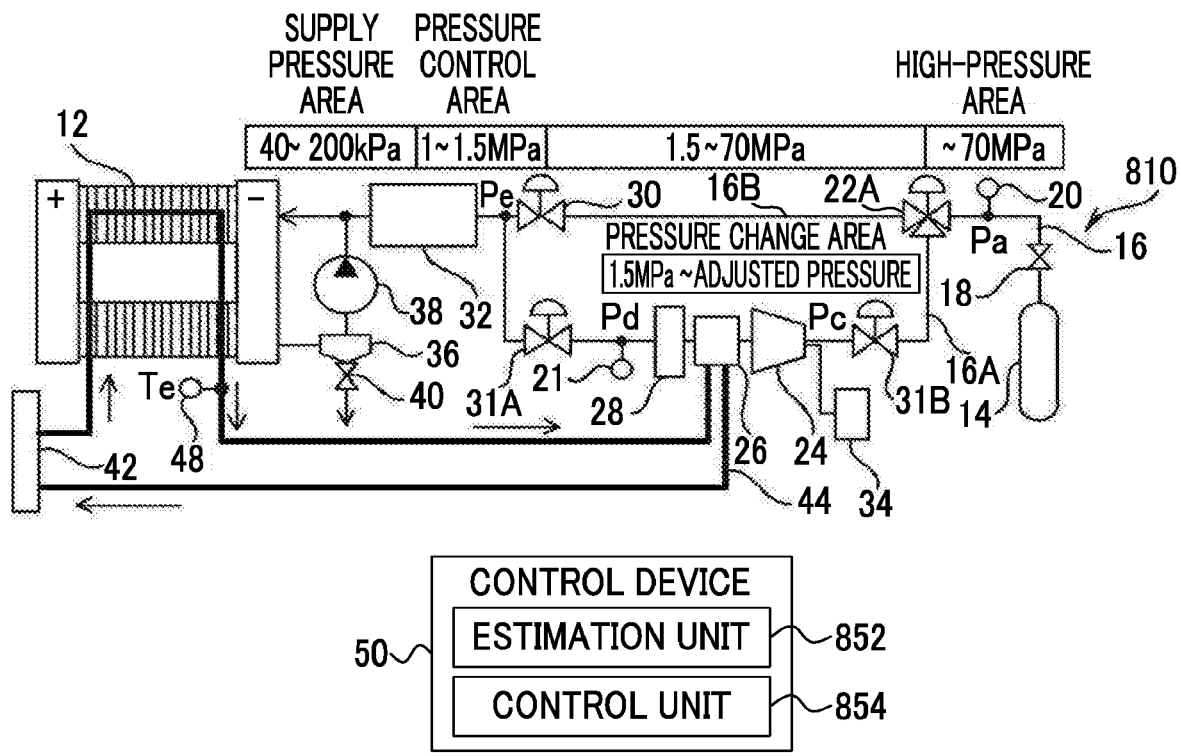
FIG. 20 is a diagram schematically illustrating an example of a configuration of a fuel cell system according to an eighth embodiment.

A configuration of a fuel cell system 810 according to this embodiment will be described below with reference to FIG. 20. As illustrated in FIG. 20, the control device 50 of the fuel cell system 810 according to this embodiment functionally includes an estimation unit 852 and a control unit 854.

The hardware configuration of the control device 50 according to this embodiment is the same as in the fifth embodiment and thus description thereof will not be repeated.

Figure 22:
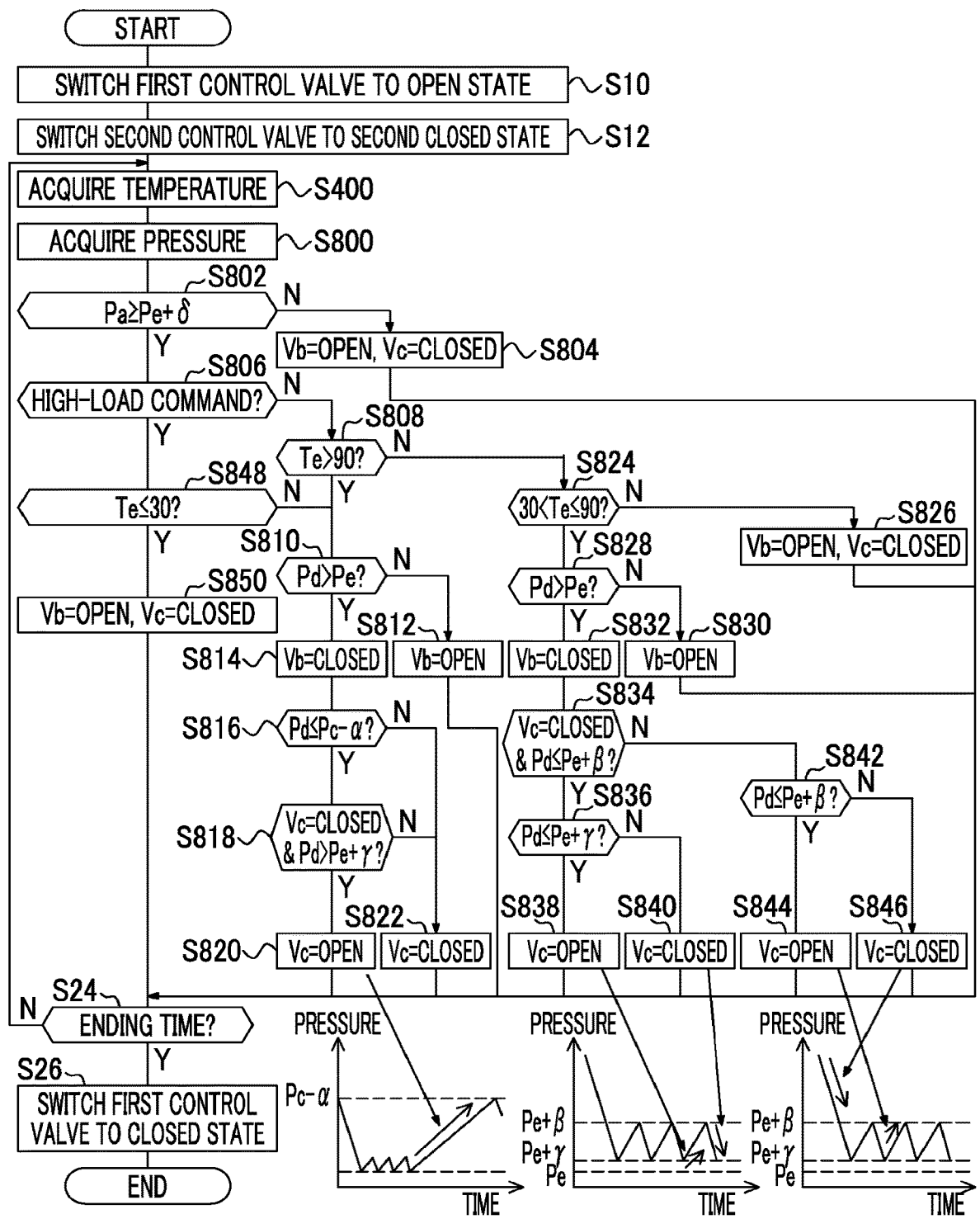
FIG. 22 is a flowchart illustrating an example of a flow of a control routine which is performed by a control device according to the eighth embodiment.

The operation of the fuel cell system 810 according to this embodiment will be described below with reference to FIG. 22. FIG. 22 is a flowchart illustrating an example of a flow of a control routine which is performed by the ECU 60 of the control device 50 according to this embodiment. In this embodiment, the control routine is performed by causing the ECU 60 to execute a program which is stored in advance in the ROM. The control routine illustrated in FIG. 22 is performed, for example, when driving of the fuel cell stack 12 is started such as when a power switch which is not illustrated is turned on. The ECU 60 of the control device 50 serves as the estimation unit 852 and the control unit 854 illustrated in FIG. 20 by executing a program which is stored in advance in the ROM. The steps in FIG. 22 in which the same processes as in FIG. 14 are performed will be referred to by the same step numbers and description thereof will not be repeated.

In order to avoid complication, in the following description, the pressure measured by the first pressure sensor 20 is defined as Pa, the pressure decreased by the third pressure control valve 31B is defined as Pc, and the pressure measured by the second pressure sensor 21 is defined as Pd. In order to avoid complication, in the following description, the pressure decreased by the pressure control valve 30 is defined as Pe and the temperature measured by the temperature sensor 48 is defined as Te.

Figure 21:
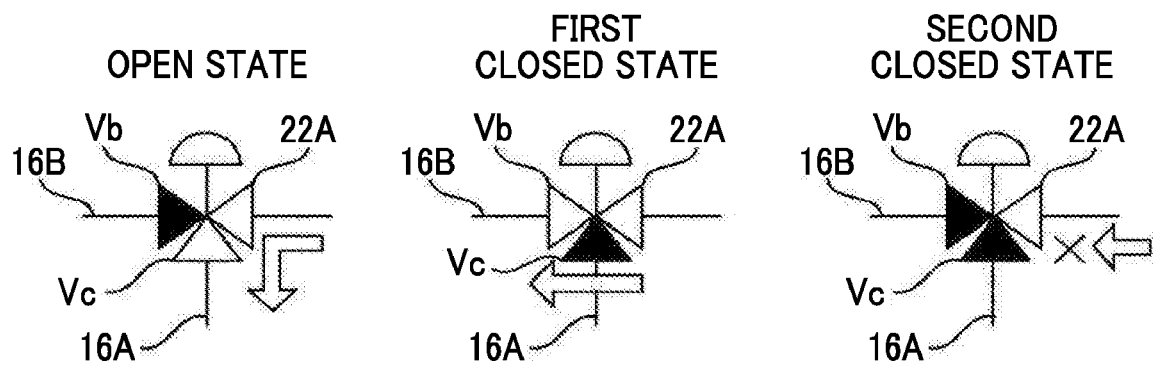
FIG. 21 is a diagram illustrating an example of states to which a second control valve can be switched according to the eighth embodiment.

In order to avoid complication, in the following description, as illustrated in FIG. 21, a state in which a first circuit Vb of the second control valve 22A connected to the second supply path 16B is put in the closed state and a second circuit Vc connected to the first supply path 16A is put in the open state corresponds to the open state in FIG. 10. As illustrated in FIG. 21, a state in which the first circuit Vb of the second control valve 22A is put in the open state and the second circuit Vc is put in the closed state corresponds to the first closed state in FIG. 10. As illustrated in FIG. 21, a state in which both the first circuit Vb and the second circuit Vc of the second control valve 22A are in the closed state corresponds to the second closed state in FIG. 10

In Step S800 of FIG. 22, the estimation unit 852 acquires the pressure Pa measured by the first pressure sensor 20 and the pressure Pd measured by the second pressure sensor 21. In Step S802, the control unit 854 determines whether Pa is equal to or greater than (Pe+$\beta$). When the determination result thereof is negative, the routine transitions to Step S804. In Step S804, the control unit 854 performs control of switching the first circuit Vb to the open state and performs control of switching the second circuit Vc to the closed state. When the process of Step S804 is completed, the routine transitions to Step S24.

On the other hand, when the determination result of Step S802 is positive, the routine transitions to Step S806. In Step S806, the control unit 854 determines whether a high-load command is input. When the determination result thereof is negative, the routine transitions to Step S808. In Step S808, the control unit 854 determines whether Te is higher than 90 [° C.]. When the determination result thereof is positive, the routine transitions to Step S810.

In Step S810, the control unit 854 determines whether Pd is higher than Pe. The routine transitions to Step S814 when the determination result thereof is positive, and the routine transitions to Step S812 when the determination result is negative. In Step S812, the control unit 854 performs control of switching the first circuit Vb to the open state. When the process of Step S812 is completed, the routine transitions to Step S24.

In Step S814, the control unit 854 performs control of switching the first circuit Vb to the closed state. In Step S816, the control unit 854 determines whether Pd is equal to or lower than (Pc−$\alpha$). The routine transitions to Step S822 when the determination result thereof is negative, and the routine transitions to Step S818 when the determination result is positive.

In Step S818, the control unit 854 determines whether the second circuit Vc is put in the closed state and Pd is higher than (Pe+$\gamma$). The routine transitions to Step S822 when the determination result thereof is negative, and the routine transitions to Step S820 when the determination result thereof is positive. In Step S820, the control unit 854 performs control of switching the second circuit Vc to the open state. When the process of Step S820 is completed, the routine transitions to Step S24. In Step S822, the control unit 854 performs control of switching the second circuit Vc to the closed state. When the process of Step S822 is completed, the routine transitions to Step S24.

On the other hand, when the determination result of Step S808 is negative, the routine transitions to Step S824. In Step S824, the control unit 854 determines whether Te is higher than 30 [° C.] and equal to or lower than 90 [° C.]. The routine transitions to Step S828 when the determination result thereof is positive, and the routine transitions to Step S826 when the determination result thereof is negative. In Step S826, the control unit 854 performs control of switching the first circuit Vb to the open state and control of switching the second circuit Vc to the closed state. When the process of Step S826 is completed, the routine transitions to Step S24.

In Step S828, the control unit 854 determines whether Pd is higher than Pe. The routine transitions to Step S832 when the determination result thereof is positive, and the routine transitions to Step S830 when the determination result is negative. In Step S830, the control unit 854 performs control of switching the first circuit Vb to the open state. When the process of Step S830 is completed, the routine transitions to Step S24.

In Step S832, the control unit 854 performs control of switching the first circuit Vb to the closed state. In Step S834, the control unit 854 determines whether the second circuit Vc is put in the closed state and Pd is equal to or lower than (Pe+β). The routine transitions to Step S842 when the determination result thereof is negative, and the routine transitions to Step S836 when the determination result is positive.

In Step S836, the control unit 854 determines whether Pd is equal to or lower than (Pe+γ). The routine transitions to Step S840 when the determination result is negative, and the routine transitions to Step S838 when the determination result is positive. In Step S838, the control unit 854 performs control of switching the second circuit Vc to the open state. When the process of Step S838 is completed, the routine transitions to Step S24. In Step S840, the control unit 854 performs control of switching the second circuit Vc to the closed state. When the process of Step S840 is completed, the routine transitions to Step S24.

In Step S842, the control unit 854 determines whether Pd is equal to or lower than (Pe+β). The routine transitions to Step S846 when the determination result thereof is negative, and the routine transitions to Step S844 when the determination result is positive. In Step S844, the control unit 854 performs control of switching the second circuit Vc to the open state. When the process of Step S844 is completed, the routine transitions to Step S24. In Step S846, the control unit 854 performs control of switching the second circuit Vc to the closed state. When the process of Step S846 is completed, the routine transitions to Step S24.

On the other hand, when the determination result of Step S806 is positive, the routine transitions to Step S848. In Step S848, the control unit 854 determines whether Te is equal to or lower than 30 [° C.]. The routine transitions to Step S810 when the determination result thereof is negative, and the routine transitions to Step S850 when the determination result is positive. In Step S850, the control unit 854 performs control of switching the first circuit Vb to the open state and control of switching the second circuit Vc to the closed state. When the process of Step S850 is completed, the routine transitions to Step S24.

In this embodiment, Pe' (=Pe+ε) obtained by adding ε corresponding to resistance of the second pressure control valve 31A to Pe may be used as the pressure at the position of Pd instead of Pe which is used to determine the lower limit value of the pressure.

As described above, according to this embodiment, the same advantages as achieved in the fifth embodiment can be achieved.

In the above-mentioned embodiments, the open/closed states of the control valves are switched by comparing the pressure difference PD between the pressure P1 upstream from the expander 24 and the pressure P2 downstream therefrom with the threshold value, but the disclosure is not limited thereto. For example, the open/closed states of the control valves may be switched by comparing a pressure ratio PR (=P2/P1) of the pressure P2 downstream from the expander 24 to the pressure P1 upstream therefrom with a threshold value. In this case, for example, in the first embodiment, when the pressure ratio PR is equal to or higher than a predetermined threshold value TH4, the second control valve 22 is switched to the closed state. For example, when the pressure ratio PR is lower than a threshold value TH5 less than the threshold value TH4, the second control valve 22 is switched to the open state. The threshold values TH4 and TH5 in this case can be appropriately determined depending on design specifications of the expander 24.

The routine which is performed by the ECU 60 in the above-mentioned embodiments is a software routine which is performed by executing a program, but may be a routine which is performed by hardware. The routine which is performed by the ECU 60 may be a routine which is performed in combination of software and hardware. The programs stored in the ROM may be recorded on various storage mediums and then distributed.

The disclosure is not limited to the above-mentioned embodiments, and can be modified in various forms without departing from the gist of the disclosure in addition to the embodiments.

What is claimed is:

1. A fuel cell system comprising:
a first decompression unit that is disposed in a supply path for supplying hydrogen from a hydrogen tank to a fuel cell stack and decompresses hydrogen to be supplied to the fuel cell stack;
an expander that is disposed upstream from the first decompression unit in the supply path and decompresses and expands hydrogen supplied from the hydrogen tank;
a flow rate adjusting unit that is disposed upstream from the expander in the supply path and is able to be switched to one of an open state in which hydrogen is supplied to the expander and a closed state in which a supply of hydrogen to the expander is intercepted or an amount of hydrogen supplied to the expander is less than that in the open state; and
a control unit that performs control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value.

2. The fuel cell system according to claim 1, further comprising:
a first pressure sensor that measures an internal pressure of the hydrogen tank as the first pressure; and
a second pressure sensor that measures a pressure between the expander and the first decompression unit as the second pressure.

3. The fuel cell system according to claim 1, wherein the control unit performs control of switching the flow rate adjusting unit to the open state when the pressure difference is equal to or greater than a third threshold value which is greater than the first threshold value or when the pressure ratio is less than a fourth threshold value which is less than the second threshold value.

4. The fuel cell system according to claim 1, wherein a bypass path that bypasses the expander from upstream to downstream is provided in the supply path, and
wherein the flow rate adjusting unit is a three-way valve that is provided in an upstream portion in the supply path connected to a first end of the bypass path, the three-way valve supplying hydrogen to the expander and intercepting supply of hydrogen to the bypass path in the open state and having a first closed state in which the supply of hydrogen to the expander is intercepted and hydrogen is supplied to the bypass path and a second closed state in which supply of hydrogen to both the expander and the bypass path is intercepted as the closed state.

5. The fuel cell system according to claim 4, further comprising a heat exchanger that is provided between a downstream portion in the supply path connected to a second end of the bypass path and the expander and performs heat exchange between hydrogen decompressed and expanded by the expander and a coolant for cooling the fuel cell stack.

6. The fuel cell system according to claim 5, further comprising a temperature sensor that measures a temperature of the coolant,
wherein the control unit performs control of switching the flow rate adjusting unit to the first closed state when the temperature measured by the temperature sensor is equal to or lower than a predetermined temperature threshold value.

7. The fuel cell system according to claim 4, wherein the first decompression unit is provided between a downstream portion in the supply path connected to a second end of the bypass path and the expander, and
wherein the fuel cell system further comprises:
a second decompression unit that is provided between the expander and the flow rate adjusting unit and decompresses hydrogen which is supplied from the hydrogen tank;
a third decompression unit that is provided in the bypass path and decompresses hydrogen which is supplied to the fuel cell stack; and
an injector that is provided between the downstream portion and the fuel cell stack.

8. The fuel cell system according to claim 4, wherein the first decompression unit is provided between a downstream portion in the supply path connected to a second end of the bypass path and the expander, and
wherein the fuel cell system further comprises:
a second decompression unit that is provided between the flow rate adjusting unit and the hydrogen tank and decompresses hydrogen which is supplied from the hydrogen tank; and
an injector that is provided in the bypass path.

9. A control device that controls a decompression unit that is disposed in a supply path for supplying hydrogen from a hydrogen tank to a fuel cell stack and decompresses hydrogen to be supplied to the fuel cell stack, an expander that is disposed upstream from the decompression unit in the supply path and decompresses and expands hydrogen supplied from the hydrogen tank, and a flow rate adjusting unit that is disposed upstream from the expander in the supply path and is able to be switched to one of an open state in which hydrogen is supplied to the expander and a closed state in which a supply of hydrogen to the expander is intercepted or an amount of hydrogen supplied to the expander is less than that in the open state, the control device comprising:
a control unit that performs control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value.

10. A fuel cell system comprising:
a first decompression unit that is disposed in a supply path for supplying hydrogen from a hydrogen tank to a fuel cell stack and is configured to decompress hydrogen to be supplied to the fuel cell stack;
an expander that is disposed upstream from the first decompression unit in the supply path and is configured to decompress and expand hydrogen supplied from the hydrogen tank;
a flow rate adjusting unit that is disposed upstream from the expander in the supply path and is configured to be able to be switched to one of an open state in which hydrogen is supplied to the expander and a closed state in which a supply of hydrogen to the expander is intercepted or an amount of hydrogen supplied to the expander is less than that in the open state; and
a control unit that is programmed to perform control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value.

11. A control device that controls a decompression unit that is disposed in a supply path for supplying hydrogen from a hydrogen tank to a fuel cell stack and is configured to decompress hydrogen to be supplied to the fuel cell stack, an expander that is disposed upstream from the decompression unit in the supply path and is configured to decompress and expand hydrogen supplied from the hydrogen tank, and a flow rate adjusting unit that is disposed upstream from the expander in the supply path and is configured to be able to be switched to one of an open state in which hydrogen is supplied to the expander and a closed state in which a supply of hydrogen to the expander is intercepted or an amount of hydrogen supplied to the expander is less than that in the open state, the control device comprising:
a control unit that is programmed to perform control of switching the flow rate adjusting unit to the closed state when a pressure difference between a first pressure upstream from the expander in the supply path and a second pressure downstream from the expander is less than a first threshold value or when a pressure ratio of the second pressure to the first pressure is equal to or greater than a second threshold value.

* * * * *